(12) United States Patent
Rui et al.

(10) Patent No.: US 11,150,803 B2
(45) Date of Patent: Oct. 19, 2021

(54) TOUCH CONTROL METHOD AND APPARATUS

(71) Applicant: HUAWEI TECHNOLOGIES CO., LTD., Shenzhen (CN)

(72) Inventors: Jiang Rui, Wuhan (CN); Zhubiao Xue, Nanjing (CN); Bo Xu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/754,599

(22) PCT Filed: Nov. 7, 2017

(86) PCT No.: PCT/CN2017/109781
§ 371 (c)(1),
(2) Date: Apr. 8, 2020

(87) PCT Pub. No.: WO2019/090486
PCT Pub. Date: May 16, 2019

(65) Prior Publication Data
US 2020/0257445 A1    Aug. 13, 2020

(51) Int. Cl.
| | | |
|---|---|---|
| *G06F 3/0488* | (2013.01) | |
| *G06F 3/041* | (2006.01) | |
| *G06F 3/0483* | (2013.01) | |

(52) U.S. Cl.
CPC ........ *G06F 3/04886* (2013.01); *G06F 3/0416* (2013.01); *G06F 3/0483* (2013.01)

(58) Field of Classification Search
CPC .............. G06F 3/04883; G06F 3/0488; G06F 3/04886; G06F 3/0482; G06F 3/0416; G06F 3/04847; A63F 13/2145; A63F 2300/1075
See application file for complete search history.

(56) References Cited

U.S. PATENT DOCUMENTS

| | | |
|---|---|---|
| 8,255,830 B2 | 8/2012 | Ording et al. |
| 8,358,281 B2 | 1/2013 | McCullough et al. |
| (Continued) | | |

FOREIGN PATENT DOCUMENTS

| | | |
|---|---|---|
| CN | 101676844 A | 3/2010 |
| CN | 103135902 A | 6/2013 |
| CN | 103713759 A | 4/2014 |
| CN | 104492080 A | 4/2015 |
| CN | 105045522 A | 11/2015 |
| (Continued) | | |

OTHER PUBLICATIONS

Maria Andersen, "How to make a magnifying glass on a MacBook", Nov. 13, 2016, Vedio URL:https://www.youtube.com/watch?v=DVCYM7QYATM,The length of the video is 2 minutes and 21 seconds.

(Continued)

*Primary Examiner* — Koosha Sharifi-Tafreshi
(74) *Attorney, Agent, or Firm* — Rimon PC

(57) ABSTRACT

This application provides a touch control method and an apparatus, and relates to the field of communications technologies. The method includes: (S601) obtaining, by a terminal, a first touch operation entered by a user on a touchscreen; (S602, S603, and S604) and mapping, by the terminal when the first touch operation is performed on a first preset area in a target interface, the first touch operation to a second touch operation, so that a target application responds to the second touch operation, where the target interface is any interface that is presented by the target application and that covers the first preset area, and the target application is running in the foreground.

16 Claims, 24 Drawing Sheets

(56) References Cited

U.S. PATENT DOCUMENTS

| | | | |
|---|---|---|---|
| 2011/0041102 A1* | 2/2011 | Kim | G06F 3/0488 |
| | | | 715/863 |
| 2011/0246952 A1 | 10/2011 | Tsao | |
| 2012/0044164 A1* | 2/2012 | Kim | G06F 3/04842 |
| | | | 345/173 |
| 2013/0139100 A1 | 5/2013 | Horiike | |
| 2013/0249810 A1* | 9/2013 | Almosnino | G06F 3/04886 |
| | | | 345/173 |
| 2015/0258430 A1* | 9/2015 | Alexeev | A63F 13/10 |
| | | | 463/36 |

FOREIGN PATENT DOCUMENTS

| | | |
|---|---|---|
| CN | 106020678 A | 10/2016 |
| CN | 106354418 A | 1/2017 |
| CN | 106775259 A | 5/2017 |
| CN | 107126698 A | 9/2017 |
| CN | 107203321 A | 9/2017 |
| CN | 107305466 A | 10/2017 |
| CN | 108604158 A | 9/2018 |
| WO | 2008052100 A2 | 5/2008 |

OTHER PUBLICATIONS

King Glory operation setup details,URL:https://pvp.qq.com/webplat/info/news_version3/15592/16864/16866/16875/m12372/201510/391184.shtml, Oct. 2015, total 6 pages.

Chen Qiang, Android Bottom-layer Interface and Driver Development Technology Details, Aug. 2012, With an English Abstract, total 5 pages.

* cited by examiner

TOUCH CONTROL METHOD AND APPARATUS

CROSS-REFERENCE TO RELATED APPLICATIONS

This application is a national stage of International Application No. PCT/CN2017/109781, filed on Nov. 7, 2017, which is hereby incorporated by reference in its entirety.

TECHNICAL FIELD

Embodiments of this application relate to the field of communications technologies, and in particular, to a touch control method and apparatus.

BACKGROUND

Currently, various terminals (for example, a mobile phone and a tablet computer) generally use a touchscreen as an input apparatus, which greatly improves user input and operation efficiency. Generally, parameters of the touchscreen such as a touch sensitivity and response events for different touch actions are set before delivery of the touchscreen (or the terminal).

However, in different touch areas in different application scenarios, users usually would like to impose different response requirements on the parameters of the touchscreen such as the touch sensitivity. For example, a refined operation is usually desired for copying text information on a web page, and comparatively rapid control experience is needed for a controlling role in running a control game. Obviously, a fixed parameter that is set before delivery cannot meet user touch requirements. This reduces input and output efficiency of the terminal.

SUMMARY

Embodiments of this application provide a touch control method and an apparatus, to implement refined and personalized control on a touchscreen, and improve input and output efficiency of a terminal.

To achieve the foregoing objective, the following technical solutions are used in the embodiments of this application.

According to a first aspect, an embodiment of this application provides a touch control method, including: obtaining, by a terminal, a first touch operation entered by a user on a touchscreen; and mapping, by the terminal when the first touch operation is performed on a first preset area in a target interface (namely, an interface presented by a target application that is running in the foreground), the first touch operation to a second touch operation, so that a target application responds to the second touch operation, to implement an application function related to the second touch operation. In other words, the user inputs the first touch operation to the touchscreen, but based on a mapping relationship that is preset by the user, the target application that is running on the terminal finally responds to the user with the second touch operation. This implements refined and customized touch control on the touchscreen, and improves input and output efficiency of the terminal.

In a possible design method, the mapping, by the terminal when the first touch operation is performed on a first preset area in a target interface, the first touch operation to a second touch operation includes: searching, by the terminal when the terminal detects the first touch operation in the target interface, for at least one preset area associated with the target application (including the first preset area); obtaining, by the terminal when a touch point of the first touch operation falls within the first preset area, a touch mapping rule that is preset for the first preset area; and mapping, by the terminal, the first touch operation to the second touch operation according to the touch mapping rule.

Optionally, the mapping, by the terminal, the first touch operation to a second touch operation includes: modifying, by the terminal, coordinate values of the touch point in the first touch operation, and using modified coordinate values as coordinate values of a touch point in the second touch operation. Subsequently, the target application may provide a corresponding visual output for the user based on the modified coordinate values of the touch point.

In a possible design method, the touch mapping rule includes a coordinate mapping parameter, and the mapping, by the terminal, the first touch operation to the second touch operation according to the touch mapping rule includes: increasing or decreasing, by the terminal, the coordinate values of the touch point in the first touch operation based on the coordinate mapping parameter, to obtain the coordinate values of the touch point in the second touch operation. In this way, the user can implement a relatively large operation effect in the preset area by performing a relatively small operation. Alternatively, the user can implement a relatively small operation effect in the preset area by performing a relatively large operation. This implements a customized effect of a touch sensitivity in the preset area.

For example, the increasing or decreasing, by the terminal, the coordinate values of the touch point in the first touch operation based on the coordinate mapping parameter includes: multiplying, by the terminal, the coordinate values of the touch point in the first touch operation by the coordinate mapping parameter, where the coordinate mapping parameter is greater than 1 or less than 1.

In a possible design method, after the modifying, by the terminal, coordinate values of the touch point in the first touch operation, the method further includes: if the touch point with the modified coordinate values falls beyond a preset control boundary of the first touch operation, using, by the terminal, coordinate values that are on the control boundary and that are most approximate to the modified coordinate values as the coordinate values of the touch point in the second touch operation. In this way, a problem that an application cannot correctly respond to the first touch operation because the modified coordinate exceeds an operation control area corresponding to the first touch operation is avoided.

In a possible design method, the mapping, by the terminal, the first touch operation to the second touch operation according to the touch mapping rule includes: mapping, by the terminal according to the touch mapping rule, a first touch event generated when the user performs the first touch operation to a second touch event generated when the user performs the second touch operation, and reporting the second touch event to the target application. In other words, before the first touch event generated by the first touch operation is reported to the target application, the second touch event generated when the user performs the second touch operation may be modified according to the touch mapping rule and reported to the target application. In this case, the target application may present, based on the second touch event, a response effect corresponding to the second touch operation, so as to implement a personalized function of touch operation customization in the preset area.

In a possible design method, the mapping, by the terminal, the first touch operation to a second touch operation, so that the target application responds to the second touch operation specifically includes: reporting, by the terminal to the target application, a touch event generated when the user performs the first touch operation, so that the target application instructs the terminal to determine the first touch operation based on the touch event; and mapping, by the terminal, the determined first touch operation to the second touch operation according to the touch mapping rule, and instructing the target application to respond to the second touch operation. In other words, the terminal may report, to the target application based on a normal procedure, the first touch event generated by the first touch operation. After determining, based on the first touch event, a specific operation (namely, the first touch operation) performed by the user, the target application may invoke, according to the touch mapping rule, a function corresponding to the second touch operation to implement an application function corresponding to the second touch operation.

For example, the touch mapping rule may be used to instruct to map a tap operation to a double-tap operation, or used to instruct to map a touch and hold operation to a continuous tap operation.

According to a second aspect, an embodiment of this application provides a touch control method, including: in response to a first input of a user, displaying, by a terminal, a setting interface used to indicate a touch area customized by a user; and in response to a second input of the user, obtaining, by the terminal, a target touch area customized by the user on the setting interface, and a touch mapping rule customized by the user for the target touch area, where the touch mapping rule is used to instruct to map a first touch operation obtained in the target touch area to a second touch operation. In this way, when subsequently receiving a specific touch operation entered by the user, the terminal may find a corresponding target touch mapping rule to respond to the touch operation, and obtain a customized touch feeling in the touch area customized by the user.

In a possible design method, the obtaining, by the terminal, a target touch area customized by the user on the setting interface includes: receiving, by the terminal, a target touch area drawn by the user on the setting interface by using a preset area template; or receiving, by the terminal, K boundary points marked by the user on the setting interface, where the K boundary points are connected in a specified sequence to constitute the target touch area, and K>2.

In a possible design method, the obtaining, by the terminal, a touch mapping rule customized by the user for the target touch area on the setting interface includes: receiving, by the terminal, a coordinate mapping parameter that is set by the user for the target touch area, where the coordinate mapping parameter is used to indicate a rule of mapping coordinate values of a touch point when the terminal responds to the first touch operation; and/or receiving, by the terminal, an event mapping parameter that is set by the user for the target touch area, where the event mapping parameter is used to indicate a rule of mapping a touch event when the terminal responds to the first touch operation.

In other words, the user may divide a touchscreen of the terminal into logical areas, to obtain the touch area customized by the user. In addition, the user may set, in the touch area customized by the user, a touch mapping rule that conforms to a current application scenario and an operation habit of the user, so that the user subsequently obtains a customized touch feeling in the touch area customized by the user. This implements refined and personalized control on the touchscreen of the terminal, so as to improve input and output efficiency of the terminal in different application scenarios.

In a possible design method, after the receiving, by the terminal, a coordinate mapping parameter that is set by the user for the target touch area, the method further includes: prompting, by the terminal, the user with a touch effect obtained at a current coordinate mapping parameter when the terminal responds to a touch operation in the target touch area, so that the user can quickly recognize the currently set coordinate mapping parameter.

In a possible design method, after the obtaining, by the terminal, a target touch area customized by the user on the setting interface, and a touch mapping rule customized by the user for the target touch area, the method further includes: receiving, by the terminal, an effective object that is set by the user for the touch mapping rule, where the effective object includes at least one application and/or at least one display interface. In other words, the touch control method provided in this application may provide customized touch feelings for different application scenarios.

In a possible design method, after the receiving, by the terminal, an effective object that is set by the user for the touch mapping rule, the method further includes: establishing, by the terminal, an association relationship among the target touch area, the touch mapping rule of the target touch area, and the effective object, so that when a touch operation entered by the user is subsequently received, a corresponding association relationship can be found to respond to the touch operation.

In a possible design method, the displaying, by the terminal, a setting interface used to indicate a touch area customized by a user includes: displaying, by the terminal through superimposing on a display interface of a target application that is running in the foreground, a translucent setting interface used to indicate the touch area customized by the user, so as to intuitively provide the user with a function of setting the customized touch area for the current target application.

According to a third aspect, an embodiment of this application provides a terminal, including a processor, a memory, and an input device that are connected by using a bus, where the input device is configured to obtain a first touch operation entered by a user on a touchscreen, and send the first touch operation to the processor; and the processor is configured to determine that the first touch operation is performed on a first preset area in a target interface, and map the first touch operation to a second touch operation, so that a target application responds to the second touch operation, where the target interface is any interface that is presented by the target application and that covers the first preset area, and the target application is running in the foreground.

In a possible design method, when the input device detects the first touch operation in the target interface, that the processor maps the first touch operation to the second touch operation specifically includes: the processor searches for at least one preset area associated with the target application, where the at least one preset area includes the first preset area; and when a touch point of the first touch operation falls within the first preset area, the processor obtains a touch mapping rule that is preset for the first preset area, and maps the first touch operation to the second touch operation according to the touch mapping rule.

In a possible design method, that the processor maps the first touch operation to the second touch operation specifically includes: the processor modifies coordinate values of the touch point in the first touch operation, and uses modified coordinate values as coordinate values of a touch point in the second touch operation.

In a possible design method, the touch mapping rule includes a coordinate mapping parameter, and that the processor maps the first touch operation to the second touch operation according to the touch mapping rule specifically includes: the processor increases or decreases the coordinate values of the touch point in the first touch operation based on the coordinate mapping parameter, to obtain the coordinate values of the touch point in the second touch operation.

In a possible design method, that the processor increases or decreases the coordinate values of the touch point in the first touch operation based on the coordinate mapping parameter specifically includes: the processor multiplies the coordinate values of the touch point in the first touch operation by the coordinate mapping parameter, where the coordinate mapping parameter is greater than 1 or less than 1.

In a possible design method, the processor is further configured to determine that the touch point with the modified coordinate values falls beyond a preset control boundary of the first touch operation, and use coordinate values that are on the control boundary and that are most approximate to the modified coordinate values as the coordinate values of the touch point in the second touch operation.

In a possible design method, that the processor maps the first touch operation to the second touch operation according to the touch mapping rule specifically includes: the processor maps, according to the touch mapping rule, a first touch event generated when the user performs the first touch operation to a second touch event generated when the user performs the second touch operation, and reports the second touch event to the target application.

In a possible design method, that the processor maps the first touch operation to the second touch operation, so that the target application responds to the second touch operation specifically includes: the processor reports, to the target application, a touch event generated when the user performs the first touch operation, so that the target application instructs the terminal to determine the first touch operation based on the touch event; and the processor maps the determined first touch operation to the second touch operation according to the touch mapping rule, and instructs the target application to respond to the second touch operation.

According to a fourth aspect, an embodiment of this application provides a terminal, including a processor, a memory, a display, and an input device that are connected by using a bus, where the input device is configured to receive a first input and a second input of a user; the display is configured to: in response to the first input, display a setting interface used to indicate a touch area customized by a user; and the processor is configured to: in response to the second input, obtain a target touch area customized by the user on the setting interface, and a touch mapping rule customized by the user for the target touch area, where the touch mapping rule is used to instruct to map a first touch operation obtained in the target touch area to a second touch operation.

In a possible design method, the input device is further configured to:

receive a target touch area drawn by the user on the setting interface by using a preset area template; or receive K boundary points marked by the user on the setting interface, where the K boundary points are connected in a specified sequence to constitute the target touch area, and K>2.

In a possible design method, the input device is further configured to: receive a coordinate mapping parameter that is set by the user for the target touch area, where the coordinate mapping parameter is used to indicate a rule of mapping coordinate values of a touch point when the terminal responds to the first touch operation; and/or receive an event mapping parameter that is set by the user for the target touch area, where the event mapping parameter is used to indicate a rule of mapping a touch event when the terminal responds to the first touch operation.

In a possible design method, the display is further configured to prompt, at a current coordinate mapping parameter, the user with a touch effect obtained when the terminal responds to a touch operation in the target touch area.

In a possible design method, the input device is further configured to receive an effective object that is set by the user for the touch mapping rule, where the effective object includes at least one application and/or at least one display interface.

In a possible design method, the processor is further configured to establish an association relationship among the target touch area, the touch mapping rule of the target touch area, and the effective object, and store the association relationship in the memory.

In a possible design method, the display is specifically configured to display, through superimposing on a display interface of a target application that is running in the foreground, a translucent setting interface used to indicate the touch area customized by the user.

According to a fifth aspect, an embodiment of this application provides a terminal, including: an obtaining unit, configured to obtain a first touch operation entered by a user on a touchscreen; and a mapping unit, configured to: when the first touch operation is performed on a first preset area on a target interface, map the first touch operation to a second touch operation, so that a target application responds to the second touch operation, where the target interface is any interface that is presented by the target application and that covers the first preset area, and the target application is running in the foreground.

In a possible design method, the mapping unit is specifically configured to: when the terminal detects the first touch operation in the target interface, search for at least one preset area associated with the target application, where the at least one preset area includes the first preset area; and when a touch point of the first touch operation falls within the first preset area, obtain a touch mapping rule that is preset for the first preset area, and maps the first touch operation to the second touch operation according to the touch mapping rule.

In a possible design method, the mapping unit is specifically configured to: modify coordinate values of the touch point in the first touch operation, and use modified coordinate values as coordinate values of a touch point in the second touch operation.

In a possible design method, the touch mapping rule includes a coordinate mapping parameter, and the mapping unit is specifically configured to increase or decrease the coordinate values of the touch point in the first touch operation based on the coordinate mapping parameter, to obtain the coordinate values of the touch point in the second touch operation.

In a possible design method, the mapping unit is specifically configured to multiply the coordinate values of the touch point in the first touch operation by the coordinate mapping parameter, where the coordinate mapping parameter is greater than 1 or less than 1.

In a possible design method, the mapping unit is further configured to, if the touch point with the modified coordinate values falls beyond a preset control boundary of the first touch operation, use coordinate values that are on the control boundary and that are most approximate to the modified coordinate values as the coordinate values of the touch point in the second touch operation.

In a possible design method, the mapping unit is specifically configured to: map, according to the touch mapping rule, a first touch event generated when the user performs the first touch operation to a second touch event generated when the user performs the second touch operation; and report the second touch event to the target application.

In a possible design method, the mapping unit is specifically configured to: report, to the target application, a touch event generated when the user performs the first touch operation, so that the target application instructs the terminal to determine the first touch operation based on the touch event; map the determined first touch operation to the second touch operation according to the touch mapping rule; and instruct the target application to respond to the second touch operation.

According to a fifth aspect, an embodiment of this application provides a terminal, including: an obtaining unit, configured to obtain a first input and a second input of a user; and a display unit, configured to display a setting interface used to indicate a touch area customized by a user, where the obtaining unit is further configured to obtain a target touch area customized by the user on the setting interface, and a touch mapping rule customized by the user for the target touch area, where the touch mapping rule is used to instruct to map a first touch operation obtained in the target touch area to a second touch operation.

In a possible design method, the obtaining unit is specifically configured to: receive a target touch area drawn by the user on the setting interface by using a preset area template; or receive K boundary points marked by the user on the setting interface, where the K boundary points are connected in a specified sequence to constitute the target touch area, and K>2.

In a possible design method, the obtaining unit is specifically configured to: receive a coordinate mapping parameter that is set by the user for the target touch area, where the coordinate mapping parameter is used to indicate a rule of mapping coordinate values of a touch point when the terminal responds to the first touch operation; and/or receive an event mapping parameter that is set by the user for the target touch area, where the event mapping parameter is used to indicate a rule of mapping a touch event when the terminal responds to the first touch operation.

In a possible design method, the display unit is further configured to prompt, at a current coordinate mapping parameter, the user with a touch effect obtained when the terminal responds to a touch operation in the target touch area.

In a possible design method, the obtaining unit is further configured to receive an effective object that is set by the user for the touch mapping rule, where the effective object includes at least one application and/or at least one display interface.

In a possible design method, the terminal further includes a storage unit, configured to establish an association relationship among the target touch area, the touch mapping rule of the target touch area, and the effective object.

In a possible design method, the display unit is specifically configured to display, through superimposing on a display interface of a target application that is running in the foreground, a translucent setting interface used to indicate the touch area customized by the user.

According to a seventh aspect, an embodiment of this application provides a terminal, including a processor, a memory, a bus, and a communications interface. The memory is configured to store a computer execution instruction. The processor and the memory are connected by using the bus. When the terminal is run, the processor executes the computer execution instruction stored in the memory, so that the terminal performs any one of the foregoing touch control methods.

According to an eighth aspect, an embodiment of this application provides a computer-readable storage medium. The computer-readable storage medium stores an instruction, and when the instruction is run on any one of the foregoing terminals, the terminal performs any one of the foregoing touch control methods.

According to a ninth aspect, an embodiment of this application provides a computer program product including an instruction. When the instruction is run on any one of the foregoing terminals, the terminal performs any one of the foregoing touch control methods.

In the embodiments of this application, names of the components in the terminal constitute no limitation on the device. In actual implementation, the components may have other names. Any component whose function is similar to that in the embodiments of this application falls within the scope of protection defined by the claims and their equivalent technologies of this application.

In addition, for technical effects brought by any design manner of the third aspect to the ninth aspect, reference may be made to technical effects brought by different design methods of the first aspect and the second aspect. Details are not described herein again.

DESCRIPTION OF EMBODIMENTS

The following terms "first" and "second" are merely intended for a purpose of description, and shall not be understood as an indication or implication of relative importance or implicit indication of the number of indicated technical features.

Therefore, a feature limited by "first" or "second" may explicitly or implicitly include one or more features. In the description of the embodiments of this application, unless otherwise stated, "a plurality of" means two or more than two.

A touch control method provided in the embodiments of this application may be applied to any terminal having a touchscreen, such as a mobile phone, a wearable device, an augmented reality (AR) device/virtual reality (VR) device, a tablet computer, a notebook computer, an ultra-mobile personal computer (UMPC), a netbook, or a personal digital assistant (PDA). Certainly, a specific form of the terminal is not limited in the following embodiments.

Figure 1:
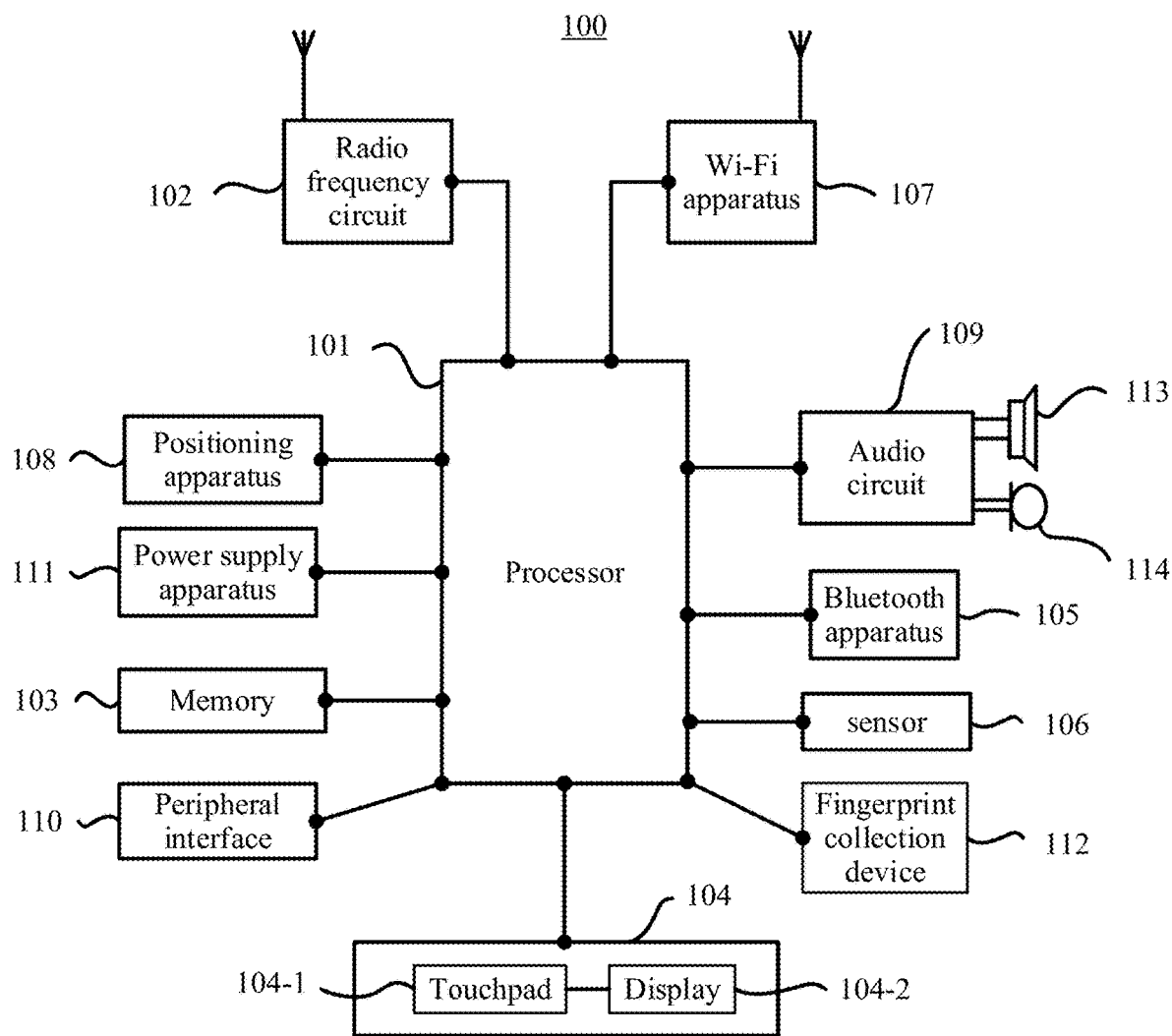
FIG. 1 is a schematic structural diagram 1 of a terminal according to an embodiment of this application.

As shown in FIG. 1, the terminal in the embodiments of this application may be a mobile phone 100. The mobile phone 100 is used as an example below to describe the embodiments in detail. It should be understood that the mobile phone 100 shown in the figure is merely an example of the terminal, and the mobile phone 100 may have more or fewer components than those shown in the figure, or may combine two or more components, or may have different component configurations.

As shown in FIG. 1, the mobile phone 100 may specifically include components such as a processor 101, a radio frequency (RF) circuit 102, a memory 103, a touchscreen 104, a Bluetooth apparatus 105, one or more sensors 106, a wireless fidelity Wi-Fi) apparatus 107, a positioning apparatus 108, an audio circuit 109, a peripheral interface 110, and a power supply system 111. These components may communicate with each other by using one or more communications buses or signal lines (not shown in FIG. 1). A person skilled in the art may understand that a hardware structure shown in FIG. 1 does not constitute a limitation on the mobile phone, and the mobile phone 100 may include more or fewer components than those shown in the figure, or may combine some components, or may have different component arrangements.

The following describes in detail the components of the mobile phone 100 with reference to FIG. 1.

The processor 101 is a control center of the mobile phone 100. The processor 101 is connected to parts of the mobile phone 100 by using various interfaces and lines, runs or executes an application program stored in the memory 103, and invokes data stored in the memory 103, to perform various functions of the mobile phone 100 and data processing. In some embodiments, the processor 101 may include one or more processing units. For example, the processor 101 may be a Kirin 960 chip manufactured by the Huawei. In some embodiments of this application, the processor 101 may further include a fingerprint verification chip, configured to verify a collected fingerprint.

The radio frequency circuit 102 may be configured to receive and send a radio signal in an information receiving and sending process or in a call process. Particularly, after receiving downlink data from a base station, the radio frequency circuit 102 may send the downlink data to the processor 101 for processing, and send related uplink data to the base station. Generally, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. The wireless communication may use any communications standard or protocol, including but not limited to global system for mobile communications, a general packet radio service, code division multiple access, wideband code division multiple access, long term evolution, an email, an SMS message service, and the like.

The memory 103 is configured to store the application program and data. The processor 101 runs the application program and the data stored in the memory 103, to perform various functions of the mobile phone 100 and data processing. The memory 103 mainly includes a program storage area and a data storage area. The program storage area may store an operating system, and an application program required by at least one function (for example, a sound playing function or an image playing function). The data storage area may store data (for example, audio data or an address book) created when the mobile phone 100 is used. In addition, the memory 103 may include a high-speed random access memory (RAM), or may include a nonvolatile memory such as a magnetic disk storage device, a flash memory device, or another volatile solid-state storage device. The memory 103 may store various operating systems such as an iOS® operating system developed by Apple and an Android® operating system developed by Google. The memory 103 may be independent and is connected to the processor 101 by using the communications bus; or the memory 103 may be integrated with the processor 101.

The touchscreen 104 may specifically include a touchpad 104-1 and a display 104-2.

The touchpad 104-1 may collect a touch operation performed by a user of the mobile phone 100 on or near the touchpad 104-1 (for example, an operation performed by the user on the touchpad 104-1 or near the touchpad 104-1 by using any proper object such as a finger or a stylus), and send collected touch information to another component (such as the processor 101). The touch operation performed by the user near the touchpad 104-1 may be referred to as a floating touch. The floating touch may mean that the user does not need to directly touch the touchpad for selecting, moving, or dragging an object (for example, an icon), and the user only needs to be near the terminal to execute an expected function. In addition, the touchpad 104-1 may be implemented in a plurality of types such as a resistive type, a capacitive type, an infrared type, a surface acoustic wave type.

The display (may also be referred to as a display screen) 104-2 may be configured to display information entered by the user or information provided for the user, and various menus of the mobile phone 100. The display 104-2 may be configured in a form of a liquid crystal display, an organic light emitting diode, or the like. The touchpad 104-1 may cover the display 104-2. After detecting the touch operation performed on or near the touchpad 104-1, the touchpad 104-1 transfers the touch operation to the processor 101 to determine a type of the touch operation. Then the processor 101 may provide a corresponding visual output on the display 104-2 based on the type of the touch operation. Although in FIG. 1, the touchpad 104-1 and the display screen 104-2 are used as two independent components to implement input and output functions of the mobile phone 100. However, in some embodiments, the touchpad 104-1 and the display screen 104-2 may be integrated to implement the input and output functions of the mobile phone 100.

Figure 2A:
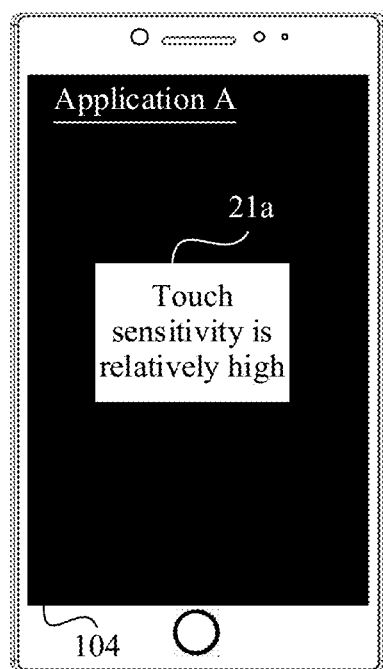
FIG. 2(a) and FIG. 2(b) are a schematic diagram 1 of an application scenario of a touch control method according to an embodiment of this application.
Figure 2B:
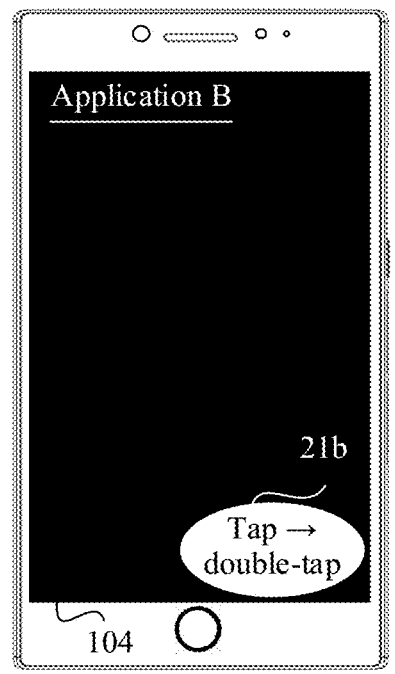

In this embodiment of this application, the user may set touch mapping rules for different touch areas on the touchscreen 104 in different application scenarios. For example, as shown in FIG. 2 (*a*), when an application A is running, a touch sensitivity of a rectangular touch area 21*a* in a center of the touchscreen 104 may be set to twice that of another area. Alternatively, as shown in FIG. 2 (*b*), when an application B is running, a response event for a touch action (for example, a tap touch action or a touch and hold touch action) in a touch area 22*b* may be customized.

Therefore, in different application scenarios, a touch area customized by the user may be obtained by dividing the touchscreen 104 into logical areas. In addition, the user may set, in the customized touch area, a touch mapping rule that conforms to a current application scenario and an operation habit of the user, so that the user subsequently obtains a customized touch feeling in the customized touch area. This implements refined and personalized control on the touchscreen 104, and provides more rich touch experience for the terminal including the touchscreen 104.

The touch sensitivity may be used to reflect a ratio of a movement distance of a display object generated when the terminal responds to a specific touch operation on the touchscreen 104 to an actual sliding distance of a finger on the touchscreen 104 in the touch operation. A higher touch sensitivity indicates a larger ratio, and a lower touch sensitivity indicates a smaller ratio. For some refined operations such as an image retouching operation and a text marking operation, a relatively low touch sensitivity may improve accuracy of these operations. However, for some operations with relatively strong real-time performance such as attack and running operations in a game, a relatively high touch sensitivity may improve speeds of these operations and user experience.

The response event for the touch action is a specific touch operation corresponding to a touch event generated by the mobile phone 100 when the mobile phone 100 receives a touch action entered by the user at a specific location on the touchscreen 104. For example, when the user taps a point C on the touchscreen 104, the mobile phone 100 may generate two touch events: an action down event and an action up event at the point C. After the mobile phone 100 reports the two touch events to a corresponding application, the application may determine, by invoking a library function that is preset in the mobile phone 100, that the two touch events correspond to a tap operation, and then respond to the tap operation to implement an application function of the tap operation at the point C.

Certainly, in addition to the touch sensitivity and the response event for the touch action, the touch mapping rule may further include other parameters used to adjust a touch habit of the user, for example, touch precision, touch pressure sensing, and a touch time. This is not limited in this embodiment of this application.

It can be understood that the touchscreen 104 is formed by stacking a plurality of layers of materials. In this embodiment of this application, only the touchpad (layer) and the display screen (layer) are displayed, and another layer is not recorded in this embodiment of this application. In addition, the touchpad 104-1 may be disposed on a front side of the mobile phone 100 in a full panel form, and the display screen 104-2 may also be disposed on the front side of the mobile phone 100 in a full panel form. In this way, a bezel-less structure can be implemented for the front side of the mobile phone.

The mobile phone 100 may further include the Bluetooth apparatus 105, configured to implement exchange data between the mobile phone 100 and another terminal (for example, a mobile phone or a smartwatch) at a short distance from the mobile phone 100. In this embodiment of this application, the Bluetooth apparatus may be an integrated circuit, a Bluetooth chip, or the like.

The mobile phone 100 may further include the at least one sensor 106, such as a fingerprint collection device 112, a light sensor, a motion sensor, and another sensor. Specifically, the fingerprint collection device 112 may be configured on a back side of the mobile phone 100 (for example, at a lower part of a rear-facing camera), or the fingerprint collection device 112 may be configured on the front of the mobile phone 100 (for example, at a lower part of the touchscreen 104). For another example, the fingerprint collection device 112 may be disposed on the touchscreen 104 to implement a fingerprint recognition function. In other words, the fingerprint collection device 112 may be integrated with the touchscreen 104 to implement the fingerprint recognition function of the mobile phone 100. The light sensor may include an ambient light sensor and a proximity sensor. The ambient light sensor may adjust luminance of the display of the touchscreen 104 based on luminance of ambient light, and the proximity sensor may power off the display when the mobile phone 100 is moved to an ear. As a type of motion sensor, an accelerometer sensor may detect acceleration values in various directions (usually on three axes). The accelerometer sensor may detect a value and a direction of gravity when the accelerometer sensor is stationary, and may be applied to an application for recognizing a mobile phone posture (for example, switching between a landscape screen and a vertical screen, a related game, and magnetometer posture calibration), a function related to vibration recognition (such as a pedometer and a knock), and the like. Other sensors such as a gyroscope, a barometer, a hygrometer, a thermometer, and an infrared sensor may be further configured in the mobile phone 100. Details are not described herein.

The Wi-Fi apparatus 107 is configured to provide the mobile phone 100 with network access that complies with a Wi-Fi related standard protocol. The mobile phone 100 may access a Wi-Fi access point by using the Wi-Fi apparatus 107, to help the user receive and send an email, browse a web page, access streaming media, and the like. The Wi-Fi apparatus 107 provides wireless broadband Internet access for the user. In some other embodiments, the Wi-Fi apparatus 107 may be used as a Wi-Fi wireless access point, and may provide Wi-Fi network access for another terminal.

The positioning apparatus 108 is configured to provide a geographical location for the mobile phone 100. It can be understood that the positioning apparatus 108 may be specifically a receiver of a positioning system such as a global positioning system (GPS), a BeiDou navigation satellite system, or a Russian GLONASS. After receiving the geographical location sent by the positioning system, the positioning apparatus 108 sends the information to the processor 101 for processing, or sends the information to the memory 103 for storage. In some other embodiments, the positioning apparatus 108 may alternatively be a receiver of an assisted global positioning system (AGPS). The AGPS system serves as an assisted server to assist the positioning apparatus 108 in completing ranging and positioning services. In this case, the assisted positioning server communicates with the terminal such as the positioning apparatus 108 (namely, a GPS receiver) of the mobile phone 100 through a wireless communications network, to provide positioning assistance. In some other embodiments, the positioning apparatus 108 may alternatively be a positioning technology that is based on a Wi-Fi access point. Each Wi-Fi access point has a globally unique media access control (MAC) address, and the terminal can scan and collect a broadcast signal of a nearby Wi-Fi access point when the terminal enables Wi-Fi. Therefore, a MAC address that is broadcast by the Wi-Fi access point can be obtained. The terminal sends, to a location server through the wireless communications network, data (for example, the MAC address) that can identify the Wi-Fi access point. The location server obtains a geographical location of each Wi-Fi access point through retrieving, calculates a geographical location of the terminal and sends the geographical location to the positioning apparatus 108 of the terminal with reference to a strength of a Wi-Fi broadcast signal.

The audio circuit 109, a speaker 113, and a microphone 114 may provide an audio interface between the user and the mobile phone 100. The audio circuit 109 may convert received audio data into an electrical signal and transmit the electrical signal to the speaker 113, and the speaker 113 converts the electrical signal into a sound signal for output. In addition, the microphone 114 converts a collected sound signal into an electrical signal, and the audio circuit 109 receives the electrical signal, converts the electrical signal into audio data, and outputs the audio data to the RF circuit 102, to send the audio data to, for example, another mobile phone, or outputs the audio data to the memory 103 for further processing.

The peripheral interface 110 is configured to provide various interfaces for an external input/output device (for example, a keyboard, a mouse, an external display, an external memory, or a subscriber identification module card). For example, the terminal is connected to the mouse through a universal serial bus (universal serial bus, USB) interface. By using a metal contact on a card slot of a subscriber identification module (subscriber identification module, SIM) card provided by a telecommunications operator, the terminal is connected to the subscriber identification module card. The peripheral interface 110 may be configured to couple the external input/output peripheral device to the processor 101 and the memory 103.

The mobile phone 100 may further include the power supply apparatus 111 (for example, a battery and a power management chip) that supplies power to the components. The battery may be logically connected to the processor 101 by using the power management chip, so that functions such as charging, discharging, and power consumption management are implemented by using the power supply apparatus 111.

Although not shown in FIG. 1, the mobile phone 100 may further include a camera (a front-facing camera and/or the rear-facing camera), a flashlight, a micro projection apparatus, a near field communication (NFC) apparatus, or the like. Details are not described herein.

Figure 3:
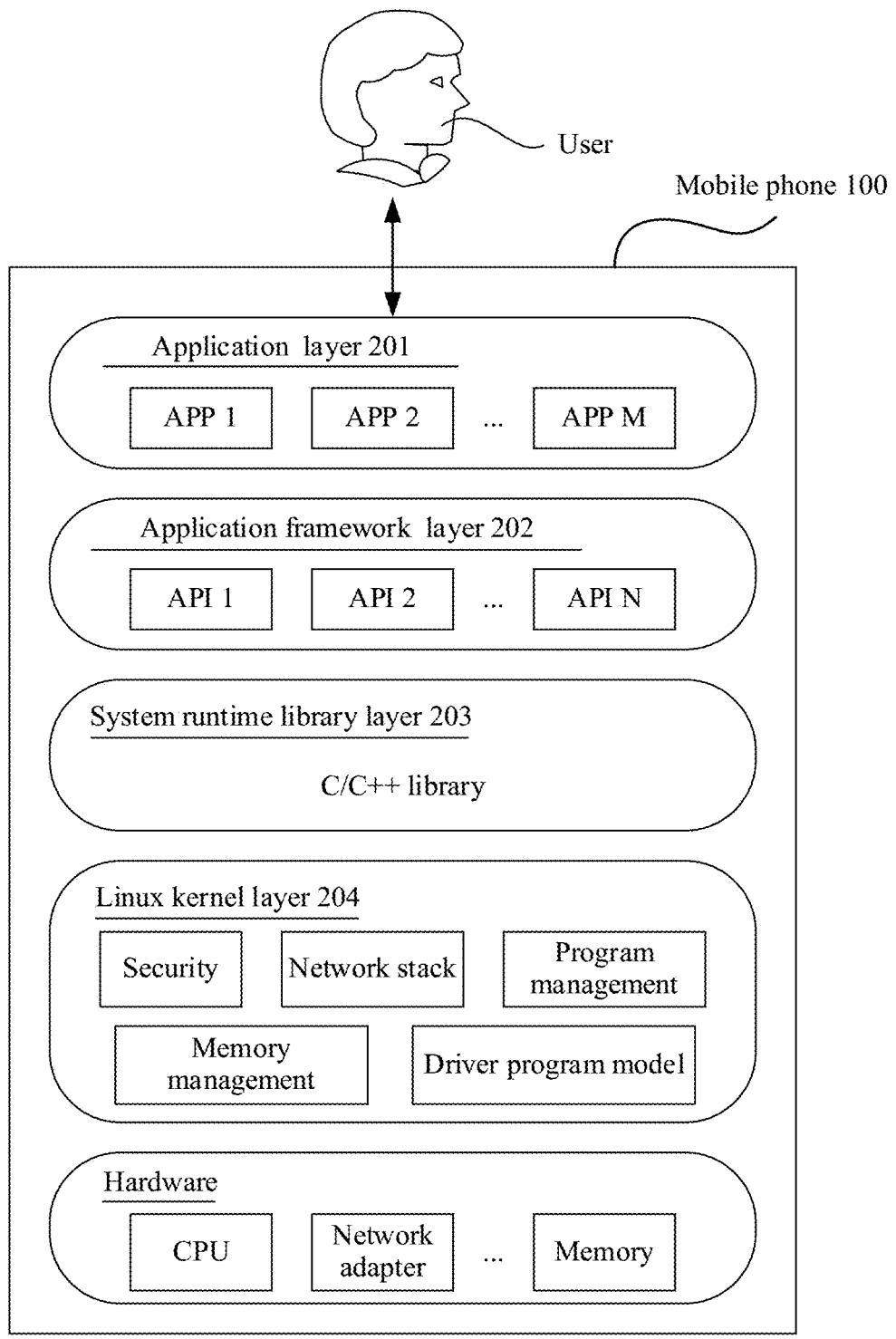
FIG. 3 is a schematic architectural diagram 1 of an Android system according to an embodiment of this application.

Further, the mobile phone 100 may run an operating system such as an Android operating system or an iOS operating system. The Android operating system is used as an example. As shown in FIG. 3, the Android operating system may be divided into four layers: an application layer 201 (namely, an APP layer), an application framework layer 202 (namely, a framework layer), a system runtime library layer 203 (namely, a library layer), and a Linux kernel layer 204 in descending order.

The Linux kernel layer 204 may be configured to control functions of the mobile phone 100 such as security, memory management, program management (Process Management), network stack, and driver model. The Linux kernel layer 204 is also used as an abstraction layer between hardware (for example, a CPU, a network interface card, and a memory) and a software stack, and may hide specific hardware details, to provide a unified service for upper layers (the system runtime library layer 203, the application framework layer 202, and the application layer 201).

The system runtime library layer 203 includes some C/C++ libraries, such as a media library, a system C library, and a display management library (surface manager). These libraries can be used by different components in the Android system, and the system runtime library layer 203 may provide a service for a developer by using the framework layer 202.

The framework layer 202 provides the developer with an API framework that can be used for fully accessing an application program. Specifically, the framework layer 202 provides a large quantity of APIs for developing an application program, and an APP that meets a related service requirement may be constructed by invoking a corresponding API.

The application layer 201 mainly includes an APP compiled in a java language. When operating an operation interface of the APP, a user interacts with the system runtime library layer 203 or the Linux kernel layer 204 by invoking a related API at the framework layer 202, to implement a function corresponding to the operation interface.

In this embodiment of this application, a process in which an APP (for example, an application A) running at the application layer 201 obtains a touch operation entered by the user on the touchscreen 104 is a process of distributing a message layer by layer in ascending order.

Figure 4:
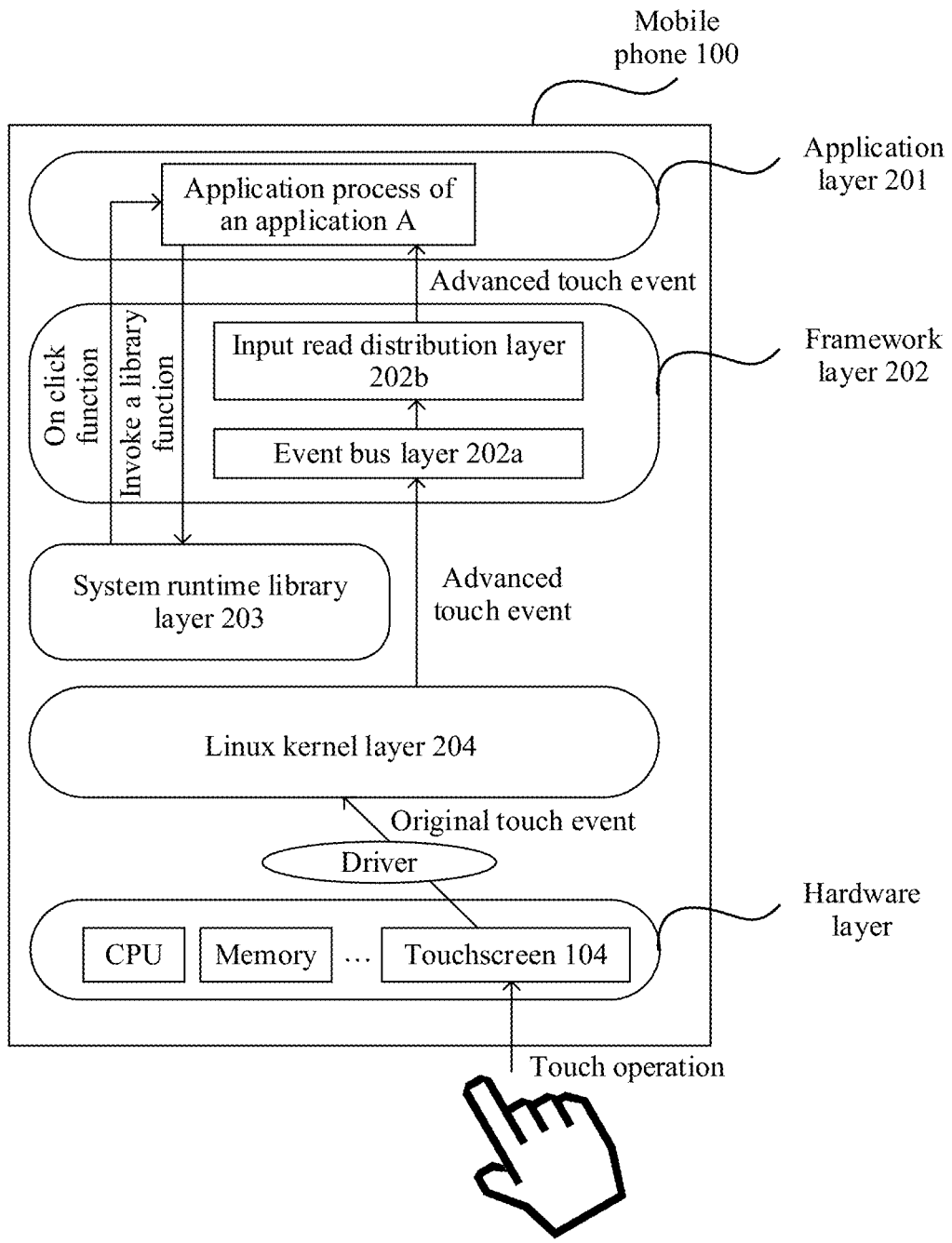
FIG. 4 is a schematic architectural diagram 2 of an Android system according to an embodiment of this application.

Specifically, as shown in FIG. 4, when a finger of the user touches the touchscreen 104 at a hardware layer, the touchscreen 104 obtains related information (for example, coordinates of a touch point) of the touch operation. Further, the touchscreen 104 may report, to the Linux kernel layer 204 in an interruption form by using a corresponding driver, an original touch event generated by the touch action. The framework layer 202 includes an event bus layer 202a that communicates with a lower layer and an input read distribution layer 202b that communicates with an upper layer. After obtaining the original touch event, the Linux kernel layer 204 may perform an encapsulation operation such as coordinate system conversion on the touch event, to generate an advanced touch event (for example, an action down event, an action move event, and an action up event) that can be read by the upper layer, and send the advanced touch event to the event bus layer 202a. Then, the event bus layer 202a distributes the advanced touch event to the input read distribution layer 202b.

Finally, the input read distribution layer 202b reports the advanced touch event to an application process of the application A that is running at the application layer 201. In this case, the application process of the application A may invoke a C/C++ library function at the system runtime library layer 203 to determine a specific operation corresponding to the advanced touch event, for example, a tap operation. Further, a library function at the system runtime library layer 203 may call back a callback function that is written by the application A for the tap operation in advance, and the callback function specifies a function executed by the application A to respond to the tap operation of the user. For example, the callback function may be an onclick function, so that the application A executes a callback function corresponding to the tap operation at a location of the touch point. For example, the onclick function written by the application A for the tap operation at the touch point is used to implement a video playback function.

Corresponding to obtaining of the touch operation, a process in which the application A at the application layer 201 implements a function indicated by the callback function is a process in which delivering is performed layer by layer in descending order, and finally the control instruction is executed by related hardware.

An example of implementing the foregoing video playback function is used. when the application process of the application A at the application layer 201 determines, based on a touch operation reported by the bottom layer, that the video playback function needs to be implemented, a video playback instruction may be generated and sent to the input read distribution layer 202b and the event bus layer 202a at the framework layer 202 layer by layer; then the event bus layer 202a sends the video playback instruction to the Linux kernel layer 204; and finally the Linux kernel layer 204 implements a video playback output by invoking hardware such as a processor, a memory, and the touchscreen 104 by using a driver.

In this embodiment of this application, the user predefines, on the touchscreen 104, a touch mapping rule of a specific touch area when the application A is running. Therefore, after the Linux kernel layer 204 obtains the touch operation reported by the touchscreen 104, the Linux kernel layer 204 (or the framework layer 202) of the terminal may determine whether a location of a touch point in the touch operation falls within the touch area customized by the user.

If the location of the touch point in the touch operation falls within the touch area customized by the user, related information carried in the touch operation may be modified according to the touch mapping rule that is set by the user. For example, the user predefines that a tap operation in a touch area 1 is mapped to a double-tap operation. In this case, when the touch operation reported by the touchscreen 104 is determined by the terminal as the tap operation falling within the touch area 1, the terminal may change a response event for the touch action from the tap operation to the double-tap operation. Further, a callback function corresponding to the double-tap operation is called back to the APP running at the application layer 201, to implement a touch control effect of the double-tap operation. This implements refined and customized touch control on the touchscreen 104, and improves input efficiency of the terminal.

Figure 5:
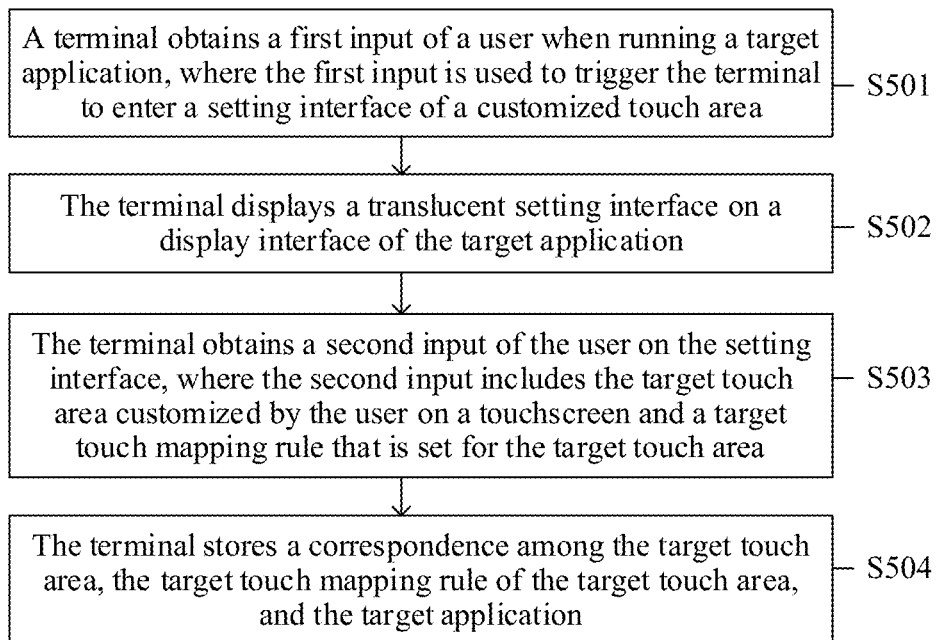
FIG. 5 is a schematic flowchart 1 of a touch control method according to an embodiment of this application.

The following describes in detail a touch control method provided in an embodiment of this application with reference to a specific embodiment. As shown in FIG. 5, the method includes the following steps.

S501. A terminal obtains a first input of a user when running a target application, where the first input is used to trigger the terminal to enter a setting interface of a customized touch area.

The target application may be any application installed in the terminal, such as a video application, a game application, or a communication application. This is not limited in this embodiment of this application.

Figure 6:
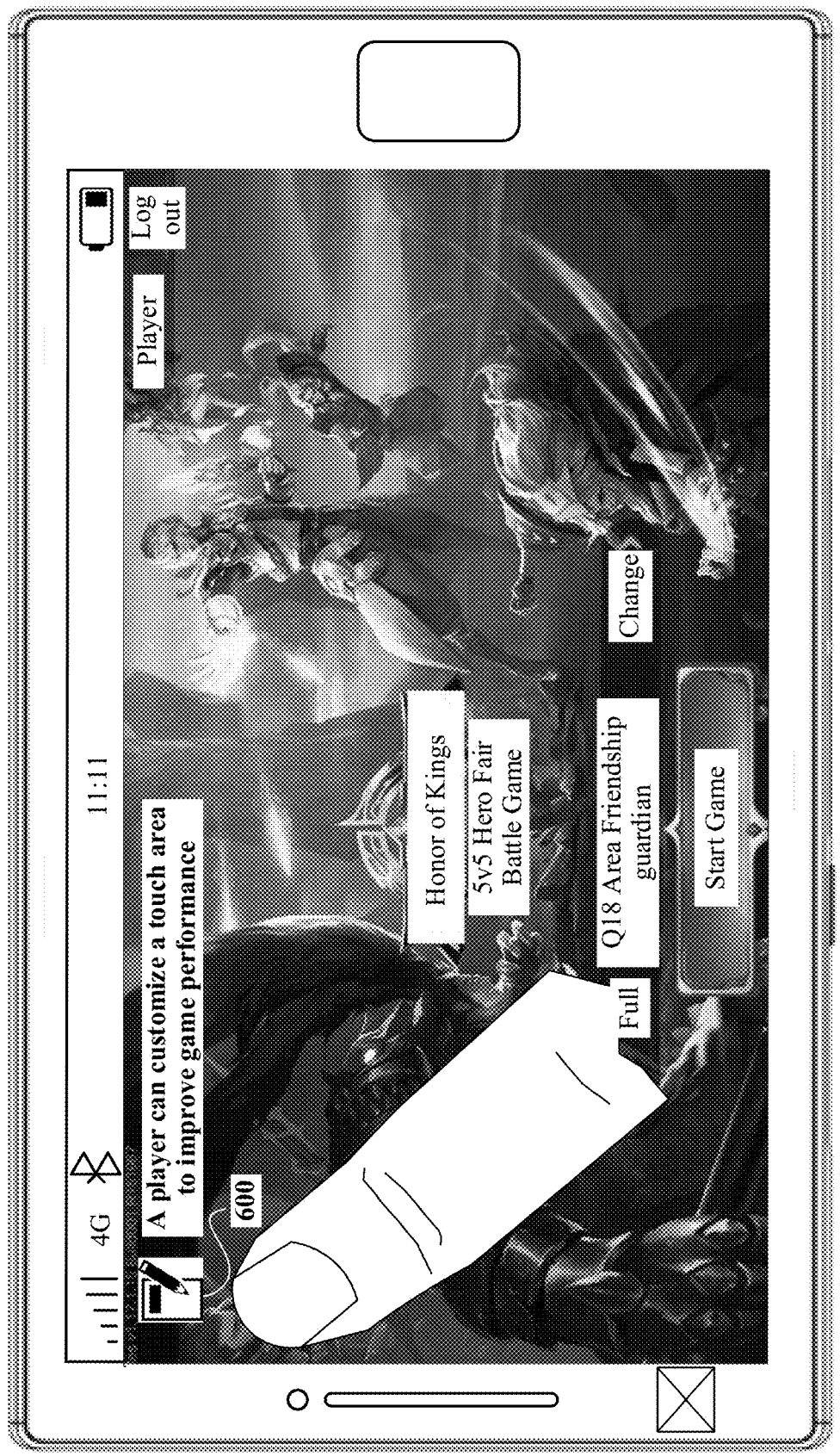
FIG. 6 is a schematic diagram 2 of an application scenario of a touch control method according to an embodiment of this application.

A game application A is used as an example. In a process in which the terminal runs the application A, a control used to customize a touch area may be displayed on a display interface of the application A. As shown in FIG. 6, a control 600 may be displayed on a login interface of the application A, to prompt the user to customize touch mapping rules for different touch areas when the application A is running. This improves input and response efficiency when the application A is running. Therefore, when it is detected that the user taps the control 600, the first input of the user is obtained.

Figure 7A:
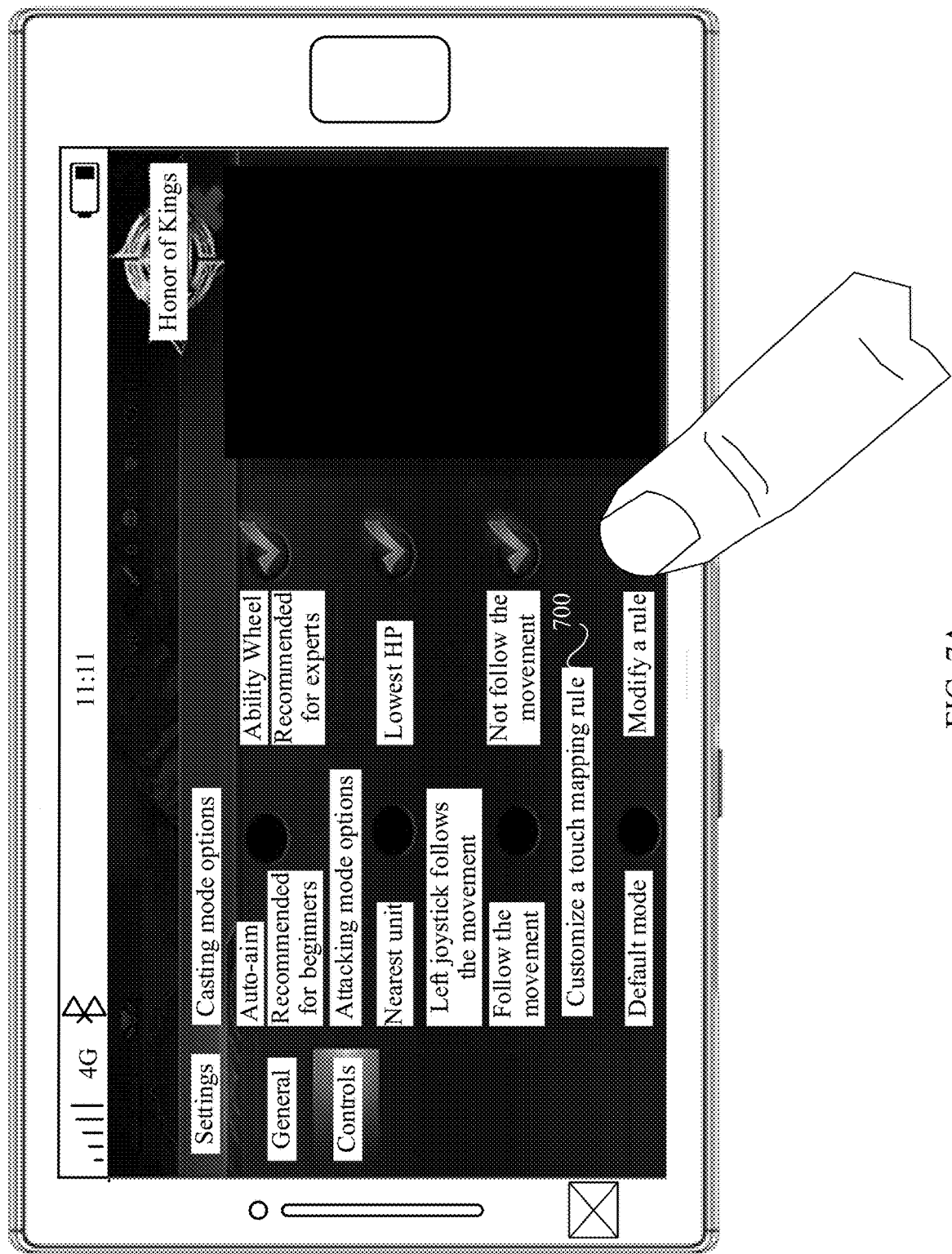
FIG. 7A is a schematic diagram 3 of an application scenario of a touch control method according to an embodiment of this application.

Alternatively, as shown in FIG. 7A, an option 700 "customize a touch mapping rule" may be set on a setting interface of the application A. After the user taps the option 700 "customize a touch mapping rule", the user may tap an option "modify a rule" to customize different touch areas and touch mapping rules for different touch areas. In this case, when it is detected that the user taps the option "modify a rule", the first input of the user is obtained.

Figure 7B:
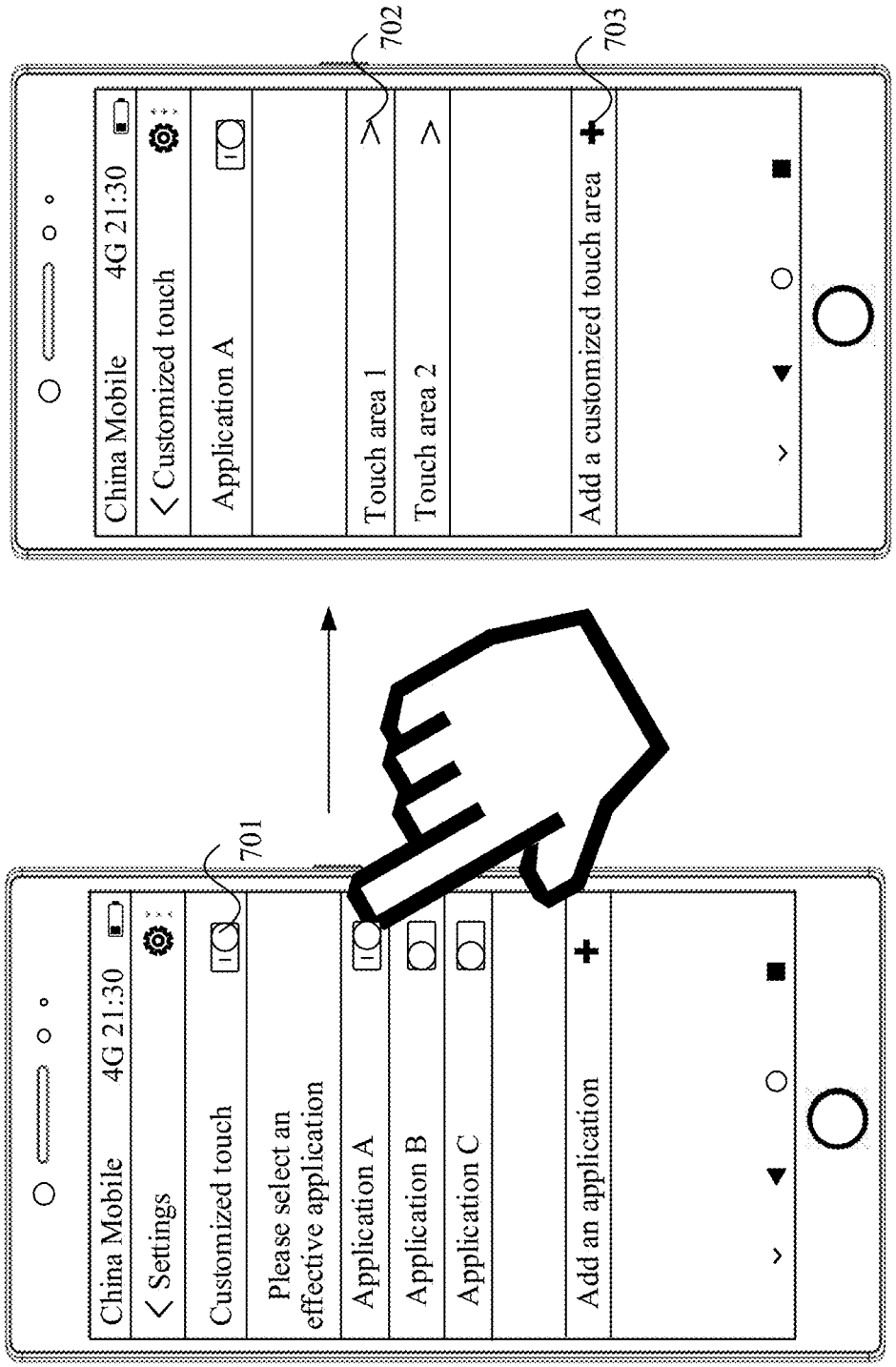
FIG. 7B is a schematic diagram 4 of an application scenario of a touch control method according to an embodiment of this application.

Certainly, the user may also provide, on a setting interface of an operating system of the terminal, an entry for setting customized touch areas and touch mapping rules for different applications. As shown in FIG. 7B, the terminal provides an option 701 "customized touch" on the setting interface. After enabling the option 701 "customized touch", the user may select to set customized touch areas and touch mapping rules for different applications (for example, the application A). The application A is used as an example. After the user selects an effective application of the customized touch as the application A, as shown in FIG. 7B, an established touch area (for example, a touch area 1 and a touch area 2 in FIG. 7B) may be modified. After the user taps a button 702 in the touch area 1, a size and a location of the touch area, and a touch mapping rule for the touch area 1 may be modified. Certainly, the user may also tap a button 703 for adding a customized touch area, to create a new touch area and touch mapping rule. This is not limited in this embodiment of this application.

Certainly, the user may also enter, to the terminal by using a voice or the like, the first input used to enable a touch mapping rule in a customized touchscreen. This is not limited in this embodiment of this application.

S502. The terminal displays a translucent setting interface on a display interface of the target application.

Figure 8:
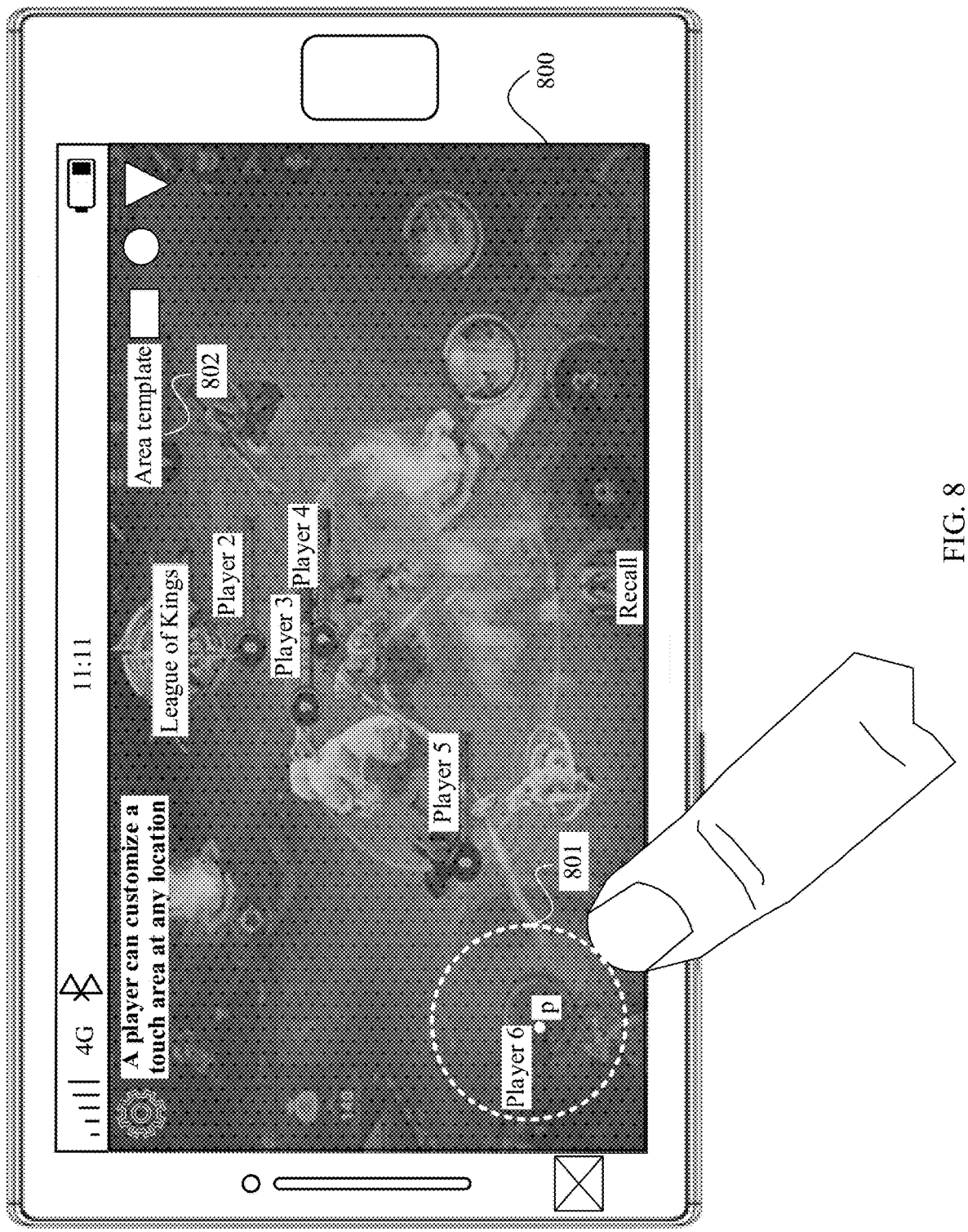
FIG. 8 is a schematic diagram 5 of an application scenario of a touch control method according to an embodiment of this application.

In response to the first input of the user, in step S502, the terminal may draw a translucent image layer on the display interface of the current target application through superimposing, and display the translucent image layer on the touchscreen of the terminal as the setting interface. In this case, as shown in FIG. 8, the terminal may prompt the user to draw a customized target touch area on a setting interface 800. The user may freely customize a target touch area required by the user, and set a touch mapping rule that is valid for the target touch area in the customized target touch area. This improves input and output performance when the target application runs.

S503. The terminal obtains a second input of the user on the setting interface, where the second input includes the target touch area customized by the user on the touchscreen and a target touch mapping rule that is set for the target touch area.

In some embodiments of this application, still as shown in FIG. 8, the user may draw a target touch area 801 of a specific size at any location on the setting interface 800 by using an area template 802 (for example, a rectangular template, a triangle template, or a circular template) that is preset by the terminal. In this case, the terminal may record a specific location and size of the target touch area 801 on the touchscreen by using a plane geometric function (for example, a rectangular area function or a circular area function) of the area template. For example, as shown in FIG. 8, the target touch area 801 may be represented as: Area 1=f (p, r), where p represents coordinates of a circle center, and r represents a circle radius.

Figure 9:
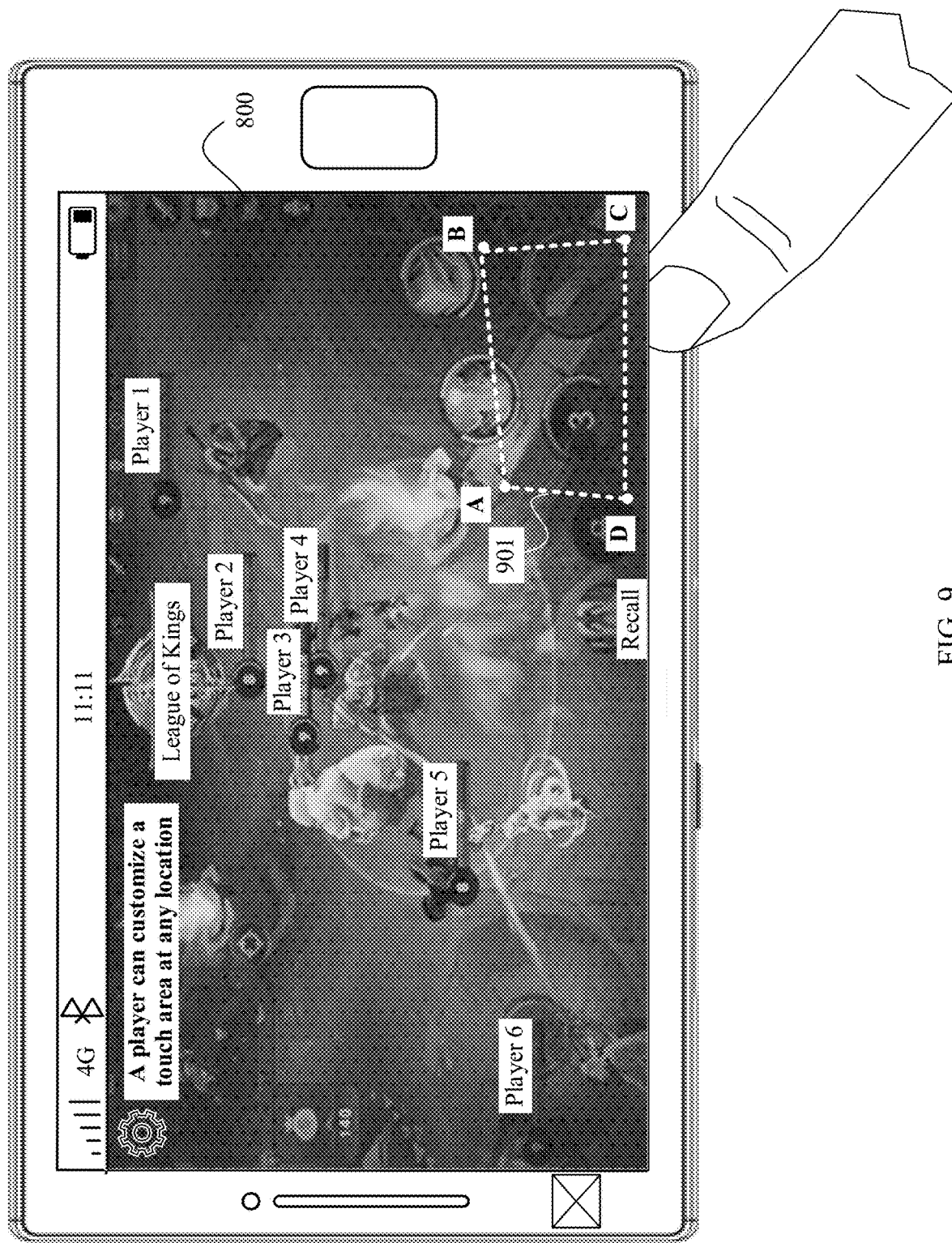
FIG. 9 is a schematic diagram 6 of an application scenario of a touch control method according to an embodiment of this application.

In some other embodiments of this application, as shown in FIG. 9, the user may also draw boundary points of the target touch area on the setting interface 800 in a specific order (for example, a clockwise or counterclockwise order). A line connecting these boundary points may constitute a target touch area 901. In this case, the terminal may record a specific location and size of the target touch area 901 on the touchscreen by using coordinates of the boundary points. For example, still as shown in FIG. 9, the target touch area 901 may be represented as Area 2 {A, B, C, D, and E}, where A, B, C, D, and E are coordinates of five boundary points of the target touch area 901 in a clockwise order.

Figure 10:
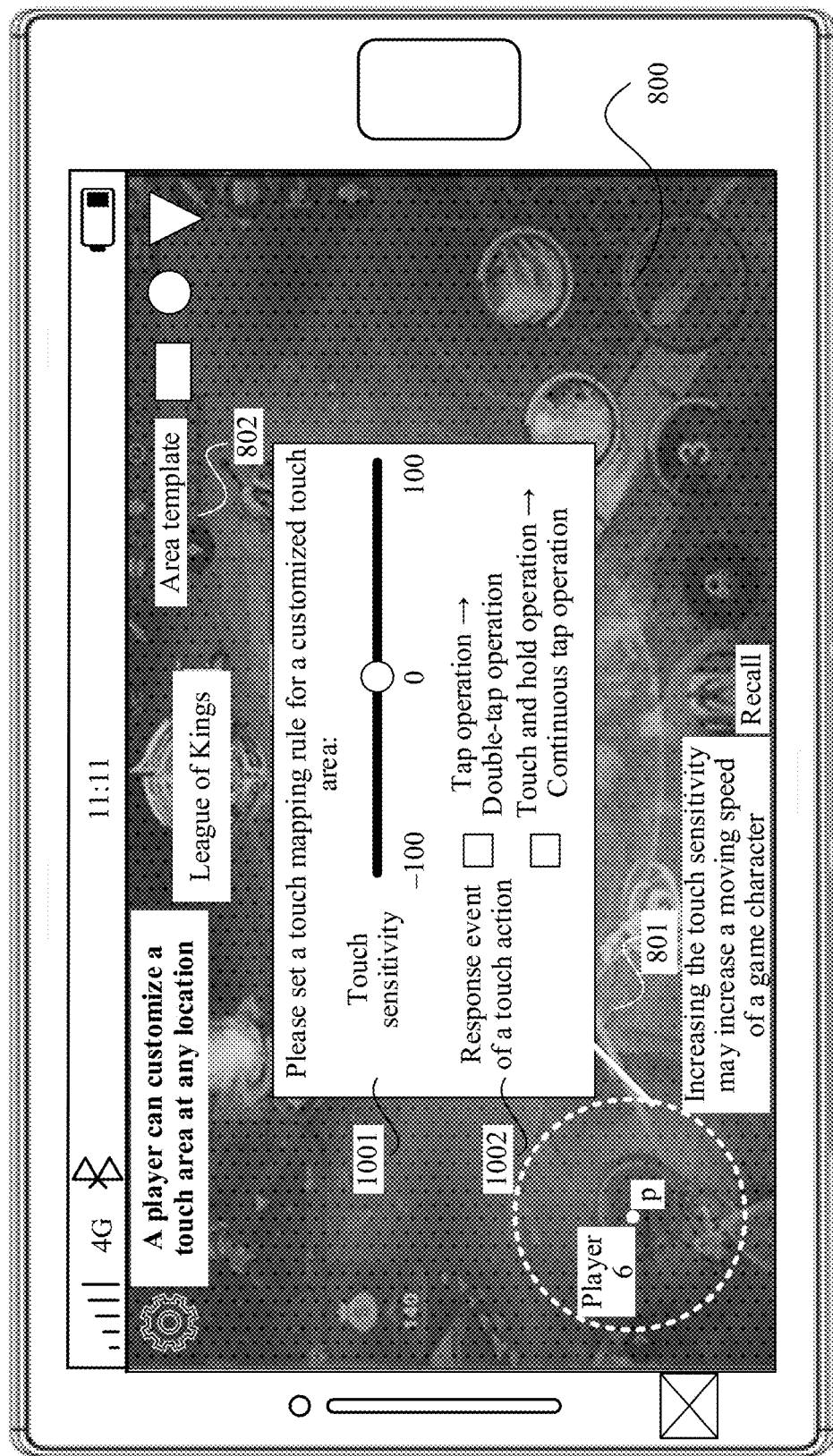
FIG. 10 is a schematic diagram 7 of an application scenario of a touch control method according to an embodiment of this application.

Further, after customizing the target touch area on the setting interface 800, the user may continue to set the touch mapping rule for the target touch area. For example, as shown in FIG. 10, the user sets a circular area in a lower left corner of a game application A as the target touch area 801. After recording the location and the size of the target touch area 801, the terminal may further prompt the user to modify a touch mapping rule for the target touch area 80, for example, a touch sensitivity 1001 of the target touch area 801 and a response event 1002 for a touch action.

The terminal may display the touch sensitivity 1001 in a form of a progress bar on a current setting interface. The user may change a progress of the progress bar by performing a drag operation, to modify the touch sensitivity of the target touch area 801.

Still as shown in FIG. 10, an example in which the progress bar of the touch sensitivity 1001 ranges from −100 to 100 is used. When the user sets the touch sensitivity 1001 to 0, it indicates that the touch sensitivity of the target touch area 801 does not need to be modified. In other words, the terminal uses a default touch sensitivity of the terminal when responding to the touch operation performed by the user in the target touch area 801. In other words, if the terminal (or the target application) predefines that when the user slides 1 cm on the touchscreen each time, a display object corresponding to the operation may be controlled to move 1 meter. Therefore, when the user sets the touch sensitivity 1001 to 0, and when the user slides 1 cm on the touchscreen each time, the terminal still controls the corresponding display object to move 1 meter when the terminal responds to the operation.

Figure 11:
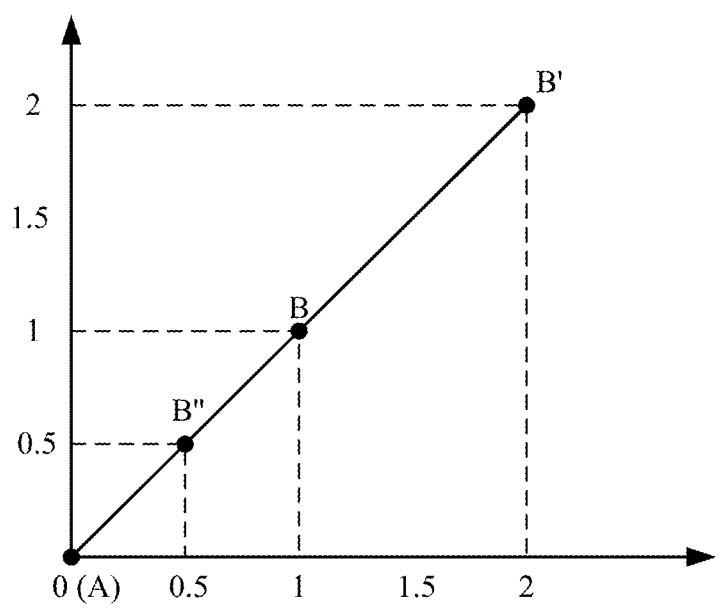
FIG. 11 is a schematic diagram 8 of an application scenario of a touch control method according to an embodiment of this application.

When the touch sensitivity 1001 that is set by the user is greater than 0, it indicates that the user expects that the touch sensitivity in the target touch area 801 is higher than a current default value. For example, a value of the touch sensitivity 1001 is 100. In this case, for each touch action of moving 1 cm by the user in the target touch area 801, the terminal may control, in response to the touch action, a corresponding display object to move 2 meters, in other words, respond to the touch action of the user in the target touch area 801 by using a distance twice the default touch sensitivity. For example, as shown in FIG. 11, when the user moves from a point A (0, 0) to a point B (1, 1) in the target touch area 801, based on the example that the touch sensitivity that is set by the user is 100, the terminal may multiply both horizontal coordinates and vertical coordinates of the point A and the point B by 2, to obtain A (0, 0) and B' (2, 2), and report the modified coordinate points to the target application, so that the target application considers that the user moves from A (0, 0) to B' (2, 2), to respond to the current touch action of the user with the double distance.

Correspondingly, when the touch sensitivity 1001 that is set by the user is less than 0, it indicates that the user expects the touch sensitivity in the target touch area 801 is lower than the current default value. For example, the value of the touch sensitivity 1001 is −100. In this case, for each touch action of moving 1 cm by the user in the target touch area 801, the terminal may control, in response to the touch action, a corresponding display object to move 0.5 meter, in other words, respond to the touch action of the user in the target touch area 801 by using a distance ½ time the default touch sensitivity. Still as shown in FIG. 11, when the user moves from the point A (0, 0) to the point B (1, 1) in the target touch area 801, based on the example that the touch sensitivity that is set by the user is −100, the terminal may multiply both horizontal coordinates and vertical coordinates of the point A and the point B by 0.5, to obtain A (0, 0) and B" (0.5, 0.5), and report the modified coordinate points to the target application, so that the target application considers that the user moves from A (0, 0) to B" (0.5, 0.5), to respond to the current touch action of the user by using ½ time the distance.

In this way, FIG. 10 is still used as an example. Because the target touch area 801 in the lower left corner of the game application A is generally used to control a movement direction and a movement distance of a game character, when the user increases the touch sensitivity in the target touch area 801, the game character may be controlled, by using a touch operation with a relatively short movement distance, to move to a relatively distant location. This improves a movement speed of the game character, brings better game experience to the user, and improves efficiency of input and output operations when the terminal runs the application A.

Figure 12:
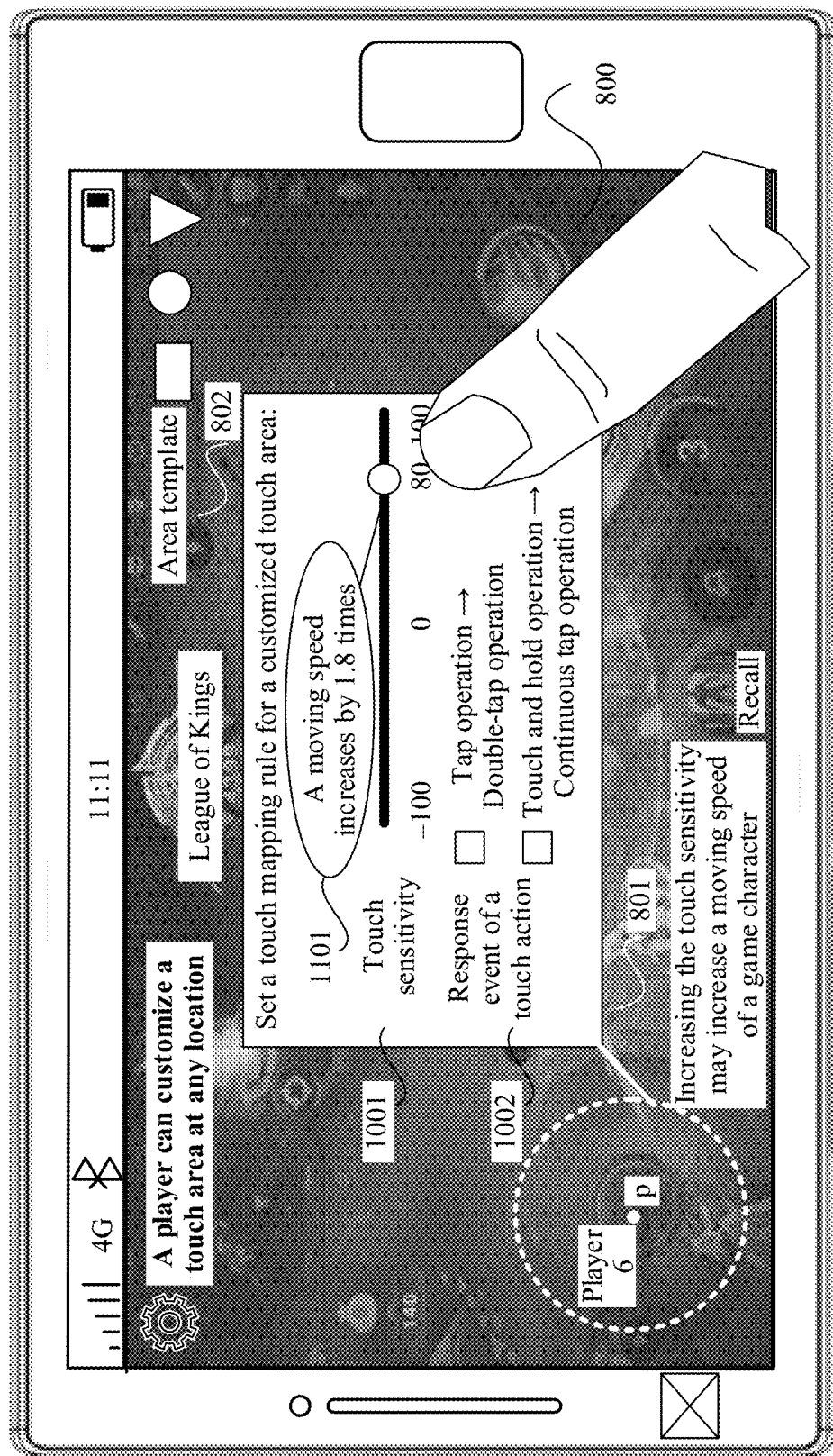
FIG. 12 is a schematic diagram 9 of an application scenario of a touch control method according to an embodiment of this application.

Optionally, to enable the user to quickly recognize the touch mapping rule of the touch sensitivity, when the user adjusts the value of the touch sensitivity 1001 to be at different locations of the progress bar, the terminal may correspondingly prompt the user with a specific meaning of a current touch sensitivity. As shown in FIG. 12, when the user sets the value of the touch sensitivity 1001 to 80, the terminal may prompt, by using a floating window 1101, the user that the movement speed of the game character is increased by 1.8 times in this case.

In this case, the terminal may use a touch sensitivity 80 that is set by the user as a coordinate mapping parameter in the touch mapping rule. Alternatively, a 1.8 times magnification rate corresponding to the touch sensitivity 80 may be used as the coordinate mapping parameter in the touch mapping rule. Certainly, when the touch sensitivity that is set by the user is less than 0, a minification rate corresponding to the current touch sensitivity may be used as the coordinate mapping parameter in the touch mapping rule. Subsequently, when detecting that the user enters a first touch operation in the target touch area, the terminal may increase or decrease coordinate values of a coordinate point in the first touch operation based on the coordinate mapping parameter, to map the first touch operation to a second touch operation.

In other words, the terminal may provide, in a form of a touch sensitivity, a customized function for the target touch area for the user, and the terminal may store, in a form of a coordinate mapping parameter, the touch sensitivity that is customized and set by the user, so as to subsequently implement the customized function for the touch sensitivity based on the coordinate mapping parameter.

It may be understood that the user may further customize a plurality of target touch areas in the setting interface displayed in step S502, and set a touch mapping rule for each target touch area.

Figure 13:
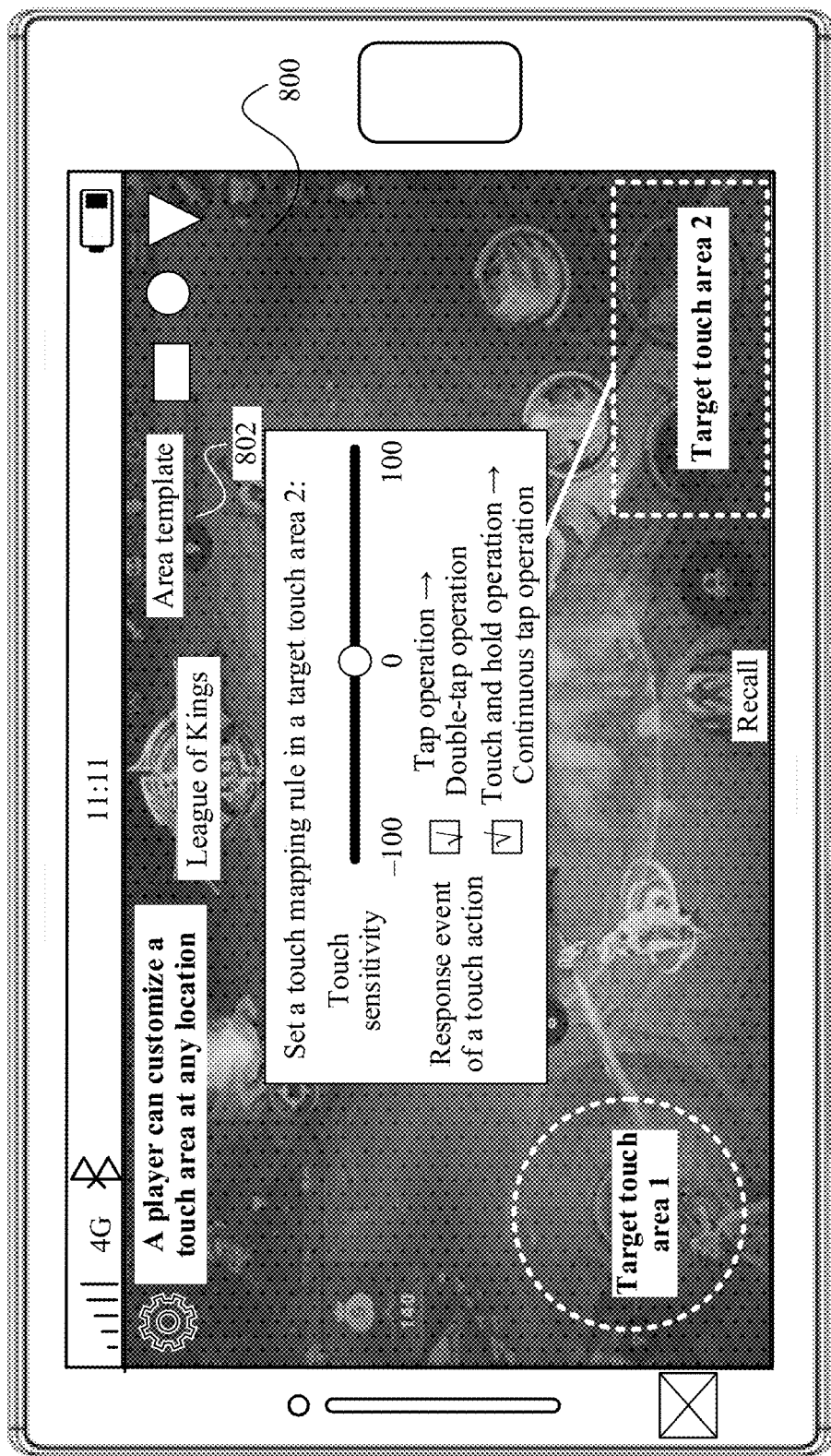
FIG. 13 is a schematic diagram 10 of an application scenario of a touch control method according to an embodiment of this application.

The game application A is still used as an example. As shown in FIG. 13, the user customizes two target touch areas on the setting interface. One is a circular area (namely, a target touch area 1) at a lower left corner of the touchscreen, and the other is a rectangular area (namely, the target touch area 2) at a lower right corner of the touchscreen.

For the target touch area 1, the user sets a value of a touch sensitivity in a touch mapping rule of the target touch area 1 to 80, so as to improve a movement speed of a game character of the application A. For the target touch area 2, because the area is generally used to implement various attack operations in a game in the application A, these operations are generally set when the application A is released or when the terminal is delivered from a factory. For example, you can double-tap an attack button to launch an attack. However, it is difficult for the user to perform a double-tap operation. The user may expect that a tap operation can also achieve an attack effect that the double-tap operation can achieve. However, some game applications determine an input value of a function by using a frequency of a continuous tap operation, but the continuous tap operation is difficult. The user may expect to achieve an effect of the continuous tap operation by performing a touch and hold operation.

In this embodiment of this application, the user may further customize a response event of a touch action in the target touch area. Still as shown in FIG. 13, the user may select an option of "mapping a tap operation to a double-tap operation" and an option of "mapping a touch and hold operation to a continuous tap operation" in the target touch area 2. The terminal stores a response event of the touch action selected by the user. Subsequently, when the terminal receives a tap operation entered by the user in the target touch area 2, the terminal may map the tap operation to a double-tap operation according to a touch mapping rule that is preset by the user for the target touch area 2, so as to implement a double-tap operation effect, and improve efficiency of input and output operations when the terminal runs the application A.

In addition, the terminal may further provide a more detailed setting option of the touch mapping rule for the user. For example, when the user sets that the tap operation is mapped to the double-tap operation, a time interval of the double-tap operation may be further set. When the user sets that the touch and hold operation is mapped to the continuous tap operation, parameters such as a time threshold (in other words, how long the touch lasts is mapped to the continuous tap operation) of the touch and hold operation and a time interval between adjacent tap operations mapped by the touch and hold operation may be set, so that touch experience of the user on an operation interface of the application A more conforms to an operation habit of the user.

Figure 14:
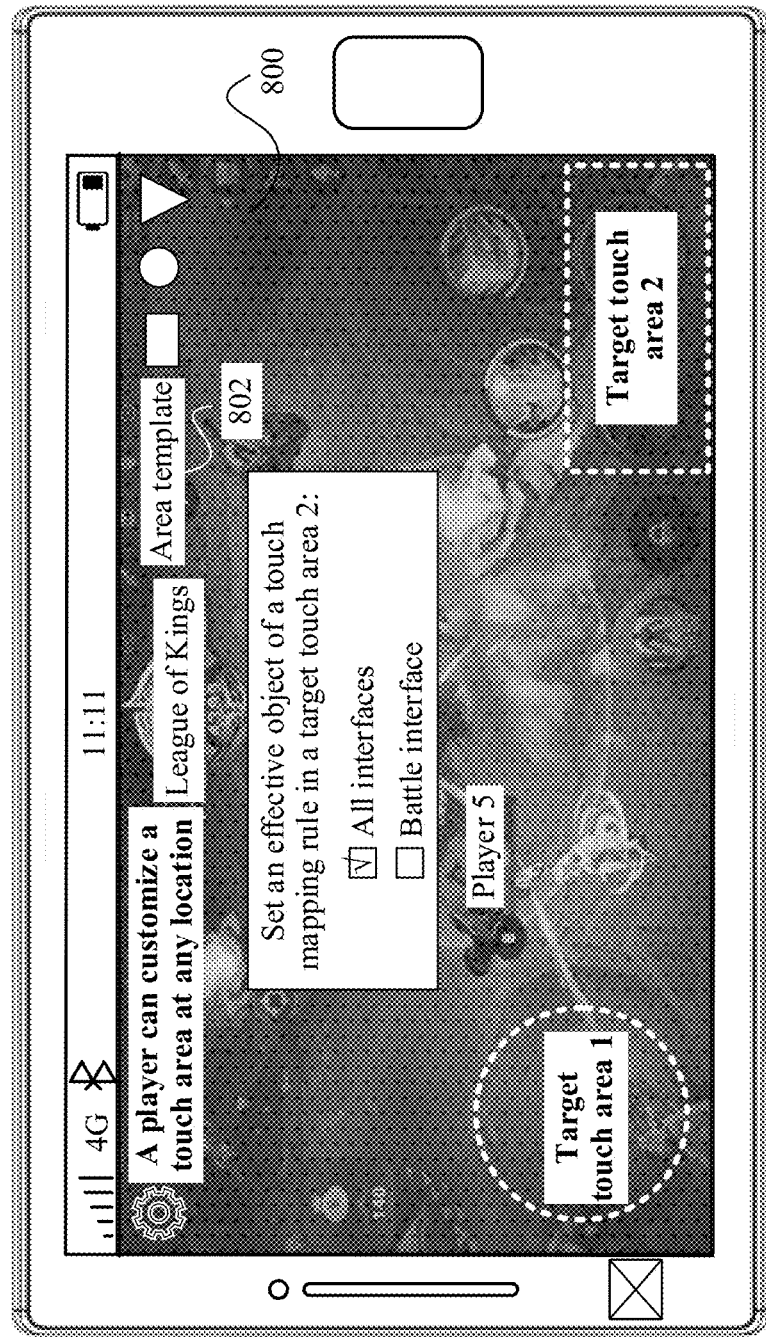
FIG. 14 is a schematic diagram 11 of an application scenario of a touch control method according to an embodiment of this application.

Further, as shown in FIG. 14, after receiving a touch mapping rule that is set by the user for a target touch area (for example, the target touch area 1), the terminal may further prompt the user to set the target touch area and an object on which the touch mapping rule of the target touch area takes effect. For example, it may be set that the touch mapping rule of increasing the touch sensitivity to 80 in the target touch area 1 takes effect on all interfaces in a running process of the application A, or it may be set that the touch mapping rule takes effect only on one or more interfaces in the running process of the application A, for example, a battle interface in a battle scenario.

Each application may distinguish different interfaces by using an interface identifier (for example, a class name of an Activity in an Android system) during running. Therefore, the terminal may associate the touch mapping rule with a class name that is of an Activity of one or more interfaces and that is set by the user.

For example, the terminal may pre-store a correspondence between different types of display interfaces in the application A and class names of Activities of the display interfaces. For example, a setting interface in the application A includes an Activity 1 and an Activity 2, and a battle interface in the application A includes an Activity 3 and an Activity 4. When the user sets an effective object of the touch mapping rule to the battle interface, the terminal may associate the touch mapping rule with the Activity 3 and the Activity 4. Subsequently, when the terminal identifies that a touch operation entered by the user occurs on the associated interface, the terminal may respond to the touch action of the user in the target touch area 1 by using the touch mapping rule. Alternatively, the user may manually enter each display interface to set a touch mapping rule that takes effect only on a current interface. This is not limited in this embodiment of this application.

Certainly, identifiers such as a package name or a process ID used when different applications are running are usually different. Therefore, the user may also set the touch mapping rule to be effective for another one or more applications. In this case, the terminal may associate the touch mapping rule with the identifier that is of the one or more applications and that is set by the user, in this way, when running the one or more applications subsequently, the terminal may also respond to the touch action of the user in the target touch area 1 by using the touch mapping rule.

Figure 15:
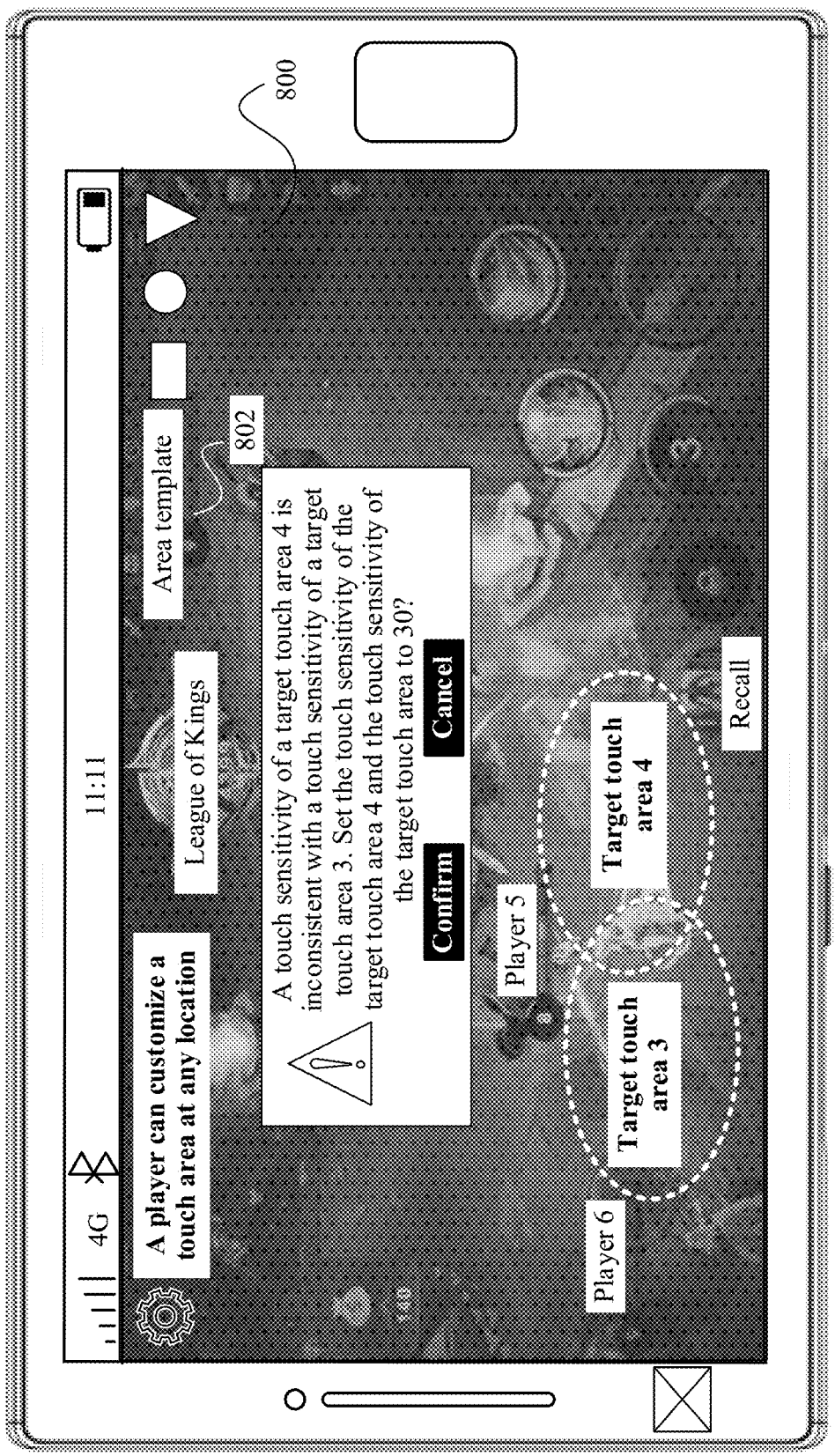
FIG. 15 is a schematic diagram 12 of an application scenario of a touch control method according to an embodiment of this application.

It should be noted that when the user customizes the plurality of target touch areas in the setting interface, the plurality of target touch areas may overlap. As shown in FIG. 15, the user first customizes and sets a target touch area 3 and a touch mapping rule A of the target touch area 3 in the setting interface, and then customizes and sets a target touch area 4 in the setting interface. There is an overlapping area between the target touch area 4 and the target touch area 3.

In this case, if a touch mapping rule B that is set by the user for the target touch area 4 conflicts with the touch mapping rule A, for example, the user sets a value of touch sensitivity in the target touch area 3 to 80, and subsequently sets a value of a touch sensitivity in the target touch area 4 to 30, the touch mapping rule B conflicts with the touch mapping rule A. In this case, the terminal may display an error prompt to the user, or still as shown in FIG. 15, the terminal may reconfirm with the user whether to change the touch sensitivity previously set for the target touch area 3, and if the user confirms to change the touch sensitivity of the target touch area 3, in this case, the terminal may set values of touch sensitivities of both the target touch area 3 and the target touch area 4 to 30.

Certainly, if the touch mapping rule A of the target touch area 3 does not conflict with the touch mapping rule B of the target touch area 4, the terminal may continue to perform the following step S504, in other words, store each target touch area customized by the user and its target touch mapping rule in a certain data structure.

S504. The terminal stores a correspondence among the target touch area, the target touch mapping rule of the target touch area, and the target application.

Specifically, after the terminal obtains the target touch area customized by the user on the touchscreen and the target touch mapping rule that is set for the target touch area, the terminal may store the correspondence among the target touch area, the target touch mapping rule of the target touch area, and the application (or an interface) on which the target touch mapping rule takes effect in a memory by using a preset data structure, so that when a touch operation entered by the user is subsequently received, a corresponding target touch mapping rule can be found to responded to the touch operation.

As shown in Table 1, the terminal may set a profile (configuration) file for each target touch area by using one target touch area as granularity. The profile file is associated with one or more corresponding applications (or interfaces). Each profile file records a location of a corresponding target touch area on the touchscreen and a target touch mapping rule of the target touch area.

A profile 1 is used as an example. The user enters a customized target touch area Area 1 and a touch sensitivity of the Area 1 (namely, the second input in step S503) to the terminal on the setting interface of the game application A. In response to the second input, the terminal generates the profile 1. The profile 1 includes coordinate information of the Area 1 and a target touch mapping rule that is set by the user for the Area 1. In the target touch mapping rule, a value of the touch sensitivity is modified to 80, and the response event of the touch action still uses a default response mechanism of the terminal and is not modified. In addition, the terminal establishes a correspondence between the profile 1 and the application A. Subsequently, when running the application A, the terminal may obtain, by querying a mapping relationship shown in Table 1, all profile files corresponding to the application A.

TABLE 1

| Identifier of an application (or an interface) | Target | | Target touch mapping rule | |
|---|---|---|---|---|
| | File number | touch area | Touch sensitivity | Response event of a touch action |
| Application A | Profile 1 | Area 1 | 80 | Default |
| | Profile 2 | Area 2 | 0 | Tap operation → double-tap operation. |
| Interface B | Profile 3 | Area 3 | 30 | Touch and hold operation → continuous tap operation |

Figure 16:
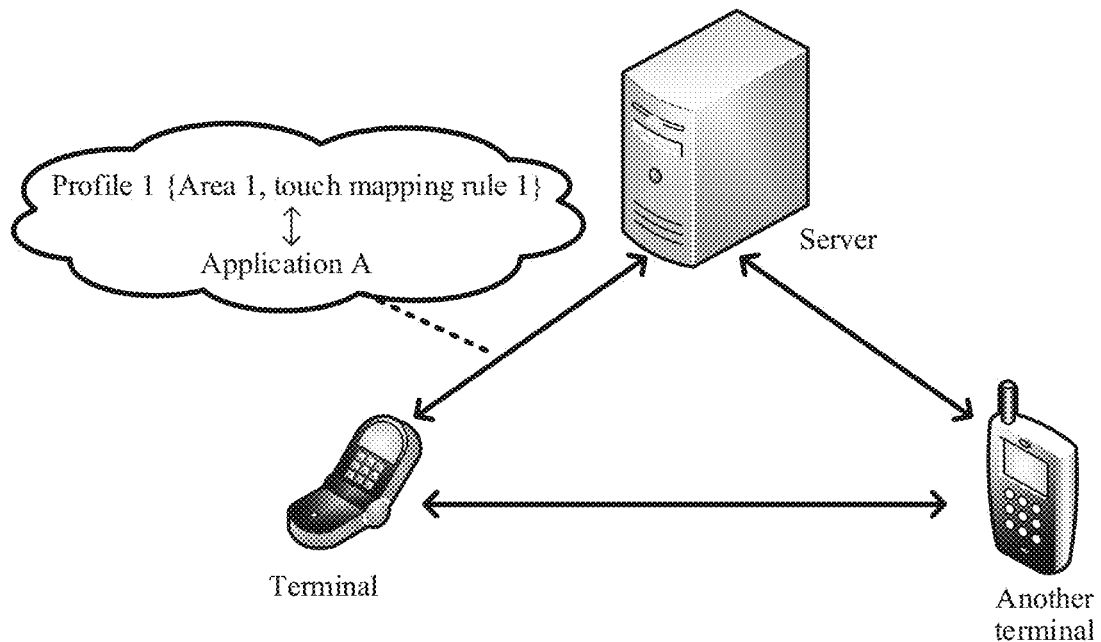
FIG. 16 is a schematic interaction diagram of a touch control method according to an embodiment of this application.

In addition, in some embodiments of this application, as shown in FIG. 16, the terminal may further share a generated profile file to another device. In this way, a same customized target area and a same touch control effect may be copied on the other device. Certainly, if a display parameter such as screen resolution of a receiving device that receives the profile file is different from a display parameter of the terminal that sends the profile file, the receiving device may also perform corresponding conversion on the received profile file for use. This is not limited in this embodiment of this application.

Alternatively, in some other embodiments of this application, still as shown in FIG. 16, the terminal may upload the generated profile file to a cloud server. When running a related application (for example, the game application A), another terminal may also download, from the cloud, the profile 1 corresponding to the application A, and copy a same customized target area and a same touch control effect on the other device.

Certainly, after receiving the profile file reported by each terminal, the server may also optimize, by using an algorithm such as big data statistics, a profile file corresponding to an application (or an interface). For example, when 90% of terminals run the application A, the value of the touch sensitivity of the Area 1 is adjusted to be greater than 80, in this case, the server may optimize a profile file that includes the Area 1 and that correspond to the application A, adjust a value of a touch sensitivity in a target touch mapping rule of the profile file that includes the Area 1 and that corresponds to the application A to 80, and further deliver an optimized profile file to a terminal whose touch sensitivity is lower than 80, so that the terminal implements a touch control effect with a higher touch sensitivity when running the application A. Certainly, after receiving the optimized profile file sent by the server, the terminal may further prompt the user whether to use the touch mapping rule that is set in the optimized profile file, so as to improve user experience.

By performing steps S501 to S504, in different application scenarios, the user may divide the touchscreen of the terminal into logical areas, to obtain a touch area customized by a user. In addition, the user may set, in the touch area customized by the user, a touch mapping rule that conforms to a current application scenario and an operation habit of the user, so that the user subsequently obtains a customized touch feeling in the touch area customized by the user. This implements refined and personalized control on the touchscreen of the terminal, so as to improve input and output efficiency of the terminal in different application scenarios.

Figure 17:
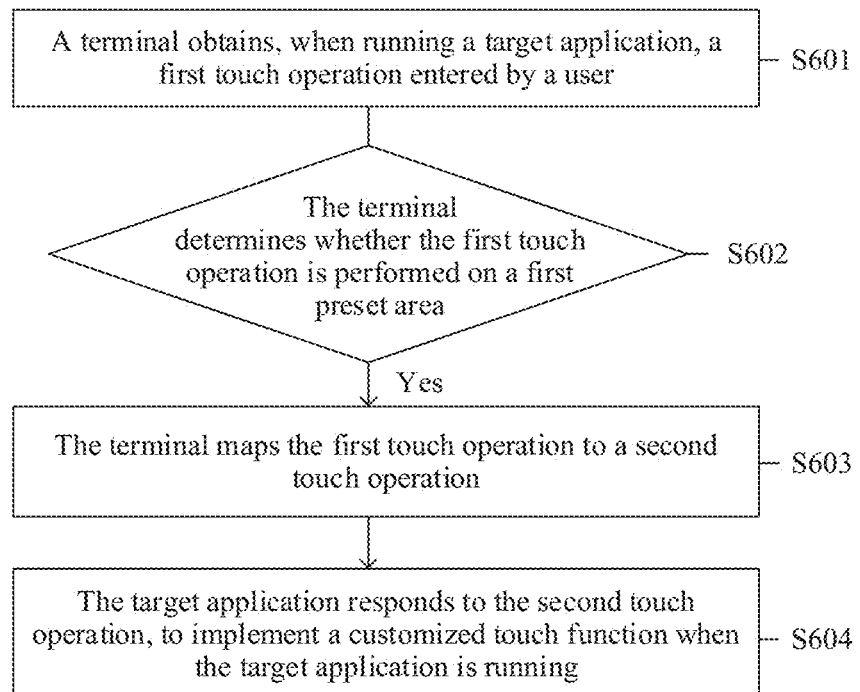
FIG. 17 is a schematic flowchart 2 of a touch control method according to an embodiment of this application.

In some other embodiments of this application, a touch control method is provided. As shown in FIG. 17, the method includes the following steps.

S601. A terminal obtains a first touch operation entered by a user on a touchscreen.

Optionally, the terminal may obtain coordinate information of a touch point through which the first touch operation passes. The touch point described herein may be a touch point detected by the touchscreen when the user enters the first touch operation, or may be a pixel that corresponds to the touch point detected by the touchscreen and that is on a display screen.

Similar to step S501, the target application may be any application installed in the terminal, such as a video application, a game application, or a communication application. This is not limited in this embodiment of this application.

The game application A is still used as an example. When running the application A, the terminal may display a display interface of the application A on the touchscreen in real time, and the user may enter a corresponding input operation on the touchscreen to implement a related function provided by the application A.

Figure 18:
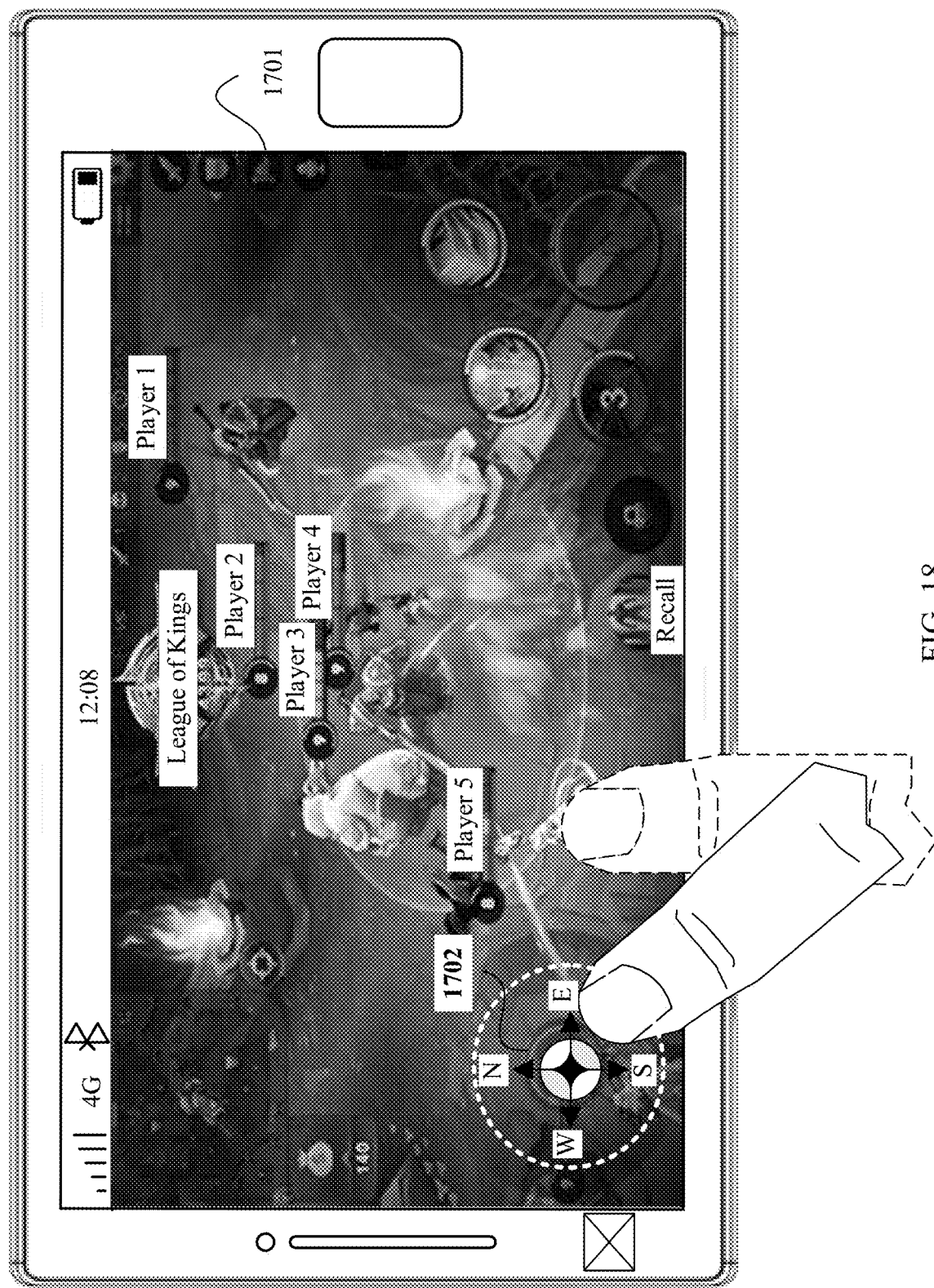
FIG. 18 is a schematic diagram 13 of an application scenario of a touch control method according to an embodiment of this application.

For example, as shown in FIG. 18, after starting the application A, the terminal enters a battle interface 1701 in a game, and the user may tap a simulated control handle 1702 in a lower left corner area of the battle interface 1701 to control a game character to move up, down, left, and right. Therefore, when the user moves the simulated control handle 1702 to slide rightward (namely, the first touch operation), the touchscreen of the terminal may report detected touch information (for example, including a touch event and coordinate information of a touch point) to a kernel layer, a framework layer, and an application layer of the terminal in sequence.

Certainly, the touchscreen may further add touch information such as touch time of the detected current touch operation to the first touch operation. This is not limited in this embodiment of this application.

In addition, the coordinate information in the touch operation may be absolute coordinate information of the touch point on the touchscreen, or may be relative coordinate information obtained after the terminal converts the absolute coordinate information.

Figure 19A:
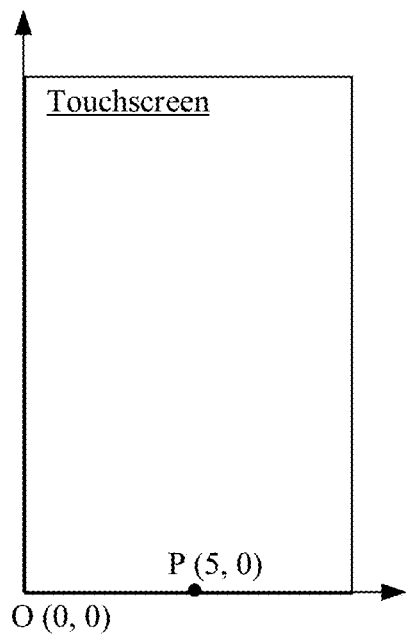
FIG. 19(a) and FIG. 19(b) are a schematic diagram 14 of an application scenario of a touch control method according to an embodiment of this application.
Figure 19B:
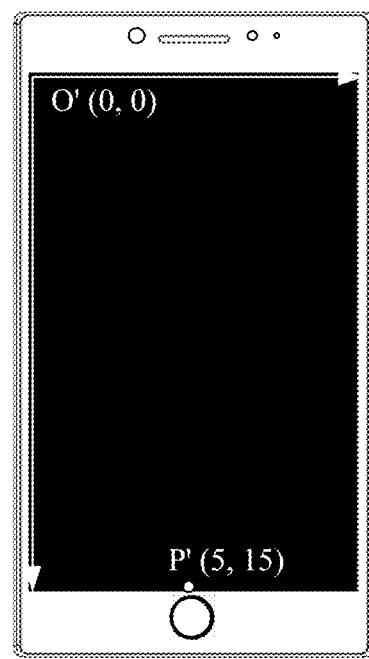

The absolute coordinate information is coordinates of the touch point in a coordinate system defined by a manufacturer of the touchscreen. For example, in a process of producing a touchscreen, a coordinate system of the touchscreen may be set in an IC chip of the touchscreen. As shown in FIG. 19 (*a*), a first coordinate system is set by using a lower left corner of the touchscreen as an origin O (0, 0). In this case, when the touchscreen detects that the user enters a touch operation at a point P of the touchscreen, it may be determined, in the first coordinate system, that coordinates of the point P are P (5, 0). In this case, P (5, 0) is the absolute coordinate information.

However, in some cases, a coordinate system set on the touchscreen may be different from a coordinate system defined by an operating system of the terminal. For example, as shown in FIG. 19 (*b*), the operating system of the terminal sets a second coordinate system by using an upper left corner of the touchscreen as an origin O' (0, 0). In this case, the touch operation entered by the user at the point P on the touchscreen is mapped, in the second coordinate system, to a touch operation at a point P' (5, 15) on the touchscreen. In this case, P' (5, 15) is the relative coordinate information.

Optionally, the foregoing process of mapping the absolute coordinate information to the relative coordinate information may be completed by the kernel layer in the terminal, or may be completed by the framework layer in the terminal. This is not limited in this embodiment of this application.

S602. The terminal determines whether the first touch operation is performed on a first preset area in a target interface.

The target interface is any interface presented by the target application running in the foreground in step S601. For example, the first preset area is the target touch area customized by the user in the foregoing embodiment, and the target interface may cover a part or all of the target touch area.

In addition, that the first touch operation is performed on the first preset area may mean that the touchscreen detects, in a floating or touch manner, that an operation object or an operation track of the first touch operation of the user falls within the first preset area. For example, when it is detected that coordinates of a touch point of the first touch operation fall within the first preset area, it may be determined that the first touch operation is performed on the first preset area.

Specifically, in step S602, after obtaining the first touch operation in the target interface, to determine whether to respond to the first touch operation by using the touch mapping rule customized by the user, the terminal may obtain an identifier of the target application that is running in the foreground at this time, and further search, based on the identifier of the target application, the correspondence shown in Table 1 for all profile files corresponding to the target application. Because each of these profile files records a specific location of the target touch area customized by the user, the terminal may determine, based on coordinate information of the touch point in the first touch operation, a profile file in which the first touch operation specifically falls within the target touch area.

For example, if the terminal obtains that an identifier of a currently running application is a package name of the application A, it may be determined, through Table 1, that two profile files (namely, the profile 1 and the profile 2 in Table 1) are customized by the user when the application A is running. Further, the terminal may separately compare coordinate information P (x, y) of the touch point in the first touch operation with the Area 1 in the profile 1 and the Area 2 in the profile 2, to determine that the P point falls within the target touch area Area 1 in the lower left corner of the touchscreen.

It should be noted that, when the terminal determines whether the coordinate information falls within the target touch area, a coordinate system used by the coordinate information of the touch point should be the same as a coordinate system used by the target touch area recorded in Table 1. For example, the terminal records the location of the Area 1 based on the second coordinate system defined by the operating system, and the coordinate information P (x, y) of the touch point in the first touch operation reported by the touchscreen to the terminal is recorded based on the first coordinate system. In this case, when the touchscreen reports the coordinate information P (x, y) to the kernel layer of the terminal, the kernel layer may map the coordinate information P (x, y) to coordinates P' (x', y') in the second coordinate system, and further determine whether the coordinates P' (x', y') falls within the target touch area Area 1.

S603. If the first touch operation falls within the first preset area, the terminal maps the first touch operation to a second touch operation.

S604. The target application responds to the second touch operation, to implement a customized touch function when the target application is running.

Figure 20:
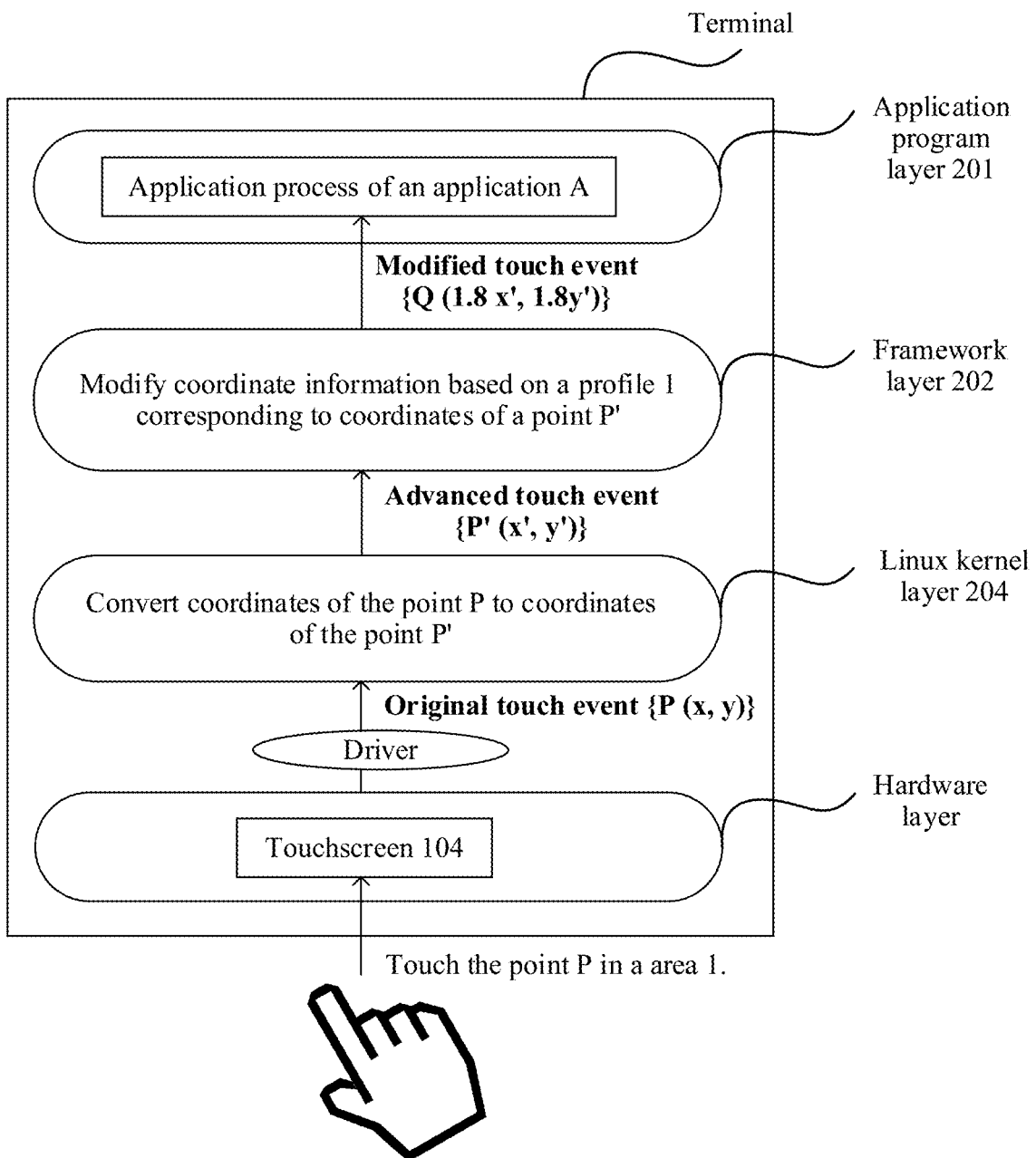
FIG. 20 is a schematic diagram 15 of an application scenario of a touch control method according to an embodiment of this application.

Still using an example in which the coordinate information P (x, y) of the touch point in the first touch operation falls within the target touch area Area 1, in this case, with reference to the architectural diagram of the Android system shown in FIG. 3 and FIG. 4, as shown in FIG. 20, the touchscreen encapsulates the detected first touch operation as an original touch event by using a driver, and reports the original touch event to a kernel layer 204 of the terminal. Further, the kernel layer 204 maps the coordinate information P (x, y) carried in the original touch event to coordinates P' (x', y') in the second coordinate system, and encapsulates the original touch event as an advanced touch event that can be read by an upper layer, and reports the advanced touch event to a framework layer 202. The framework layer 202 may determine, by querying a correspondence between a profile file and an application shown in Table 1, that coordinates P' (x', y') carried in the advanced touch event falls within the target touch area Area 1 customized by the user in the profile 1.

In this case, the terminal may search for a target touch mapping rule recorded in the profile 1. A coordinate mapping parameter used to reflect a touch sensitivity is set in the target touch mapping rule. For example, the coordinate mapping parameter is 1.8, in other words, the application A responds, at a distance ratio of 1.8 times, to the first touch action entered by the user in the target touch area Area 1. Then, the framework layer 202 may multiply both a horizontal coordinate and a vertical coordinate in the coordinates P' (x', y') by 1.8 times, to obtain modified coordinates Q (1.8x', 1.8y'), and use the modified coordinates Q (1.8x', 1.8y') as coordinate information of a touch point in the second touch operation. The framework layer 202 adds the modified coordinates Q (1.8 x', 1.8y') to the advanced touch event, and reports the advanced touch event to the application A that is running at the application layer, so that the application A may respond to the second touch operation based on the modified coordinates Q (1.8x', 1.8y'). In other words, the user enters the first touch operation at the point P (x, y) to the touchscreen, and an application in the terminal finally responds to the user with the second touch operation at the point Q (1.8x', 1.8y').

Figure 21:
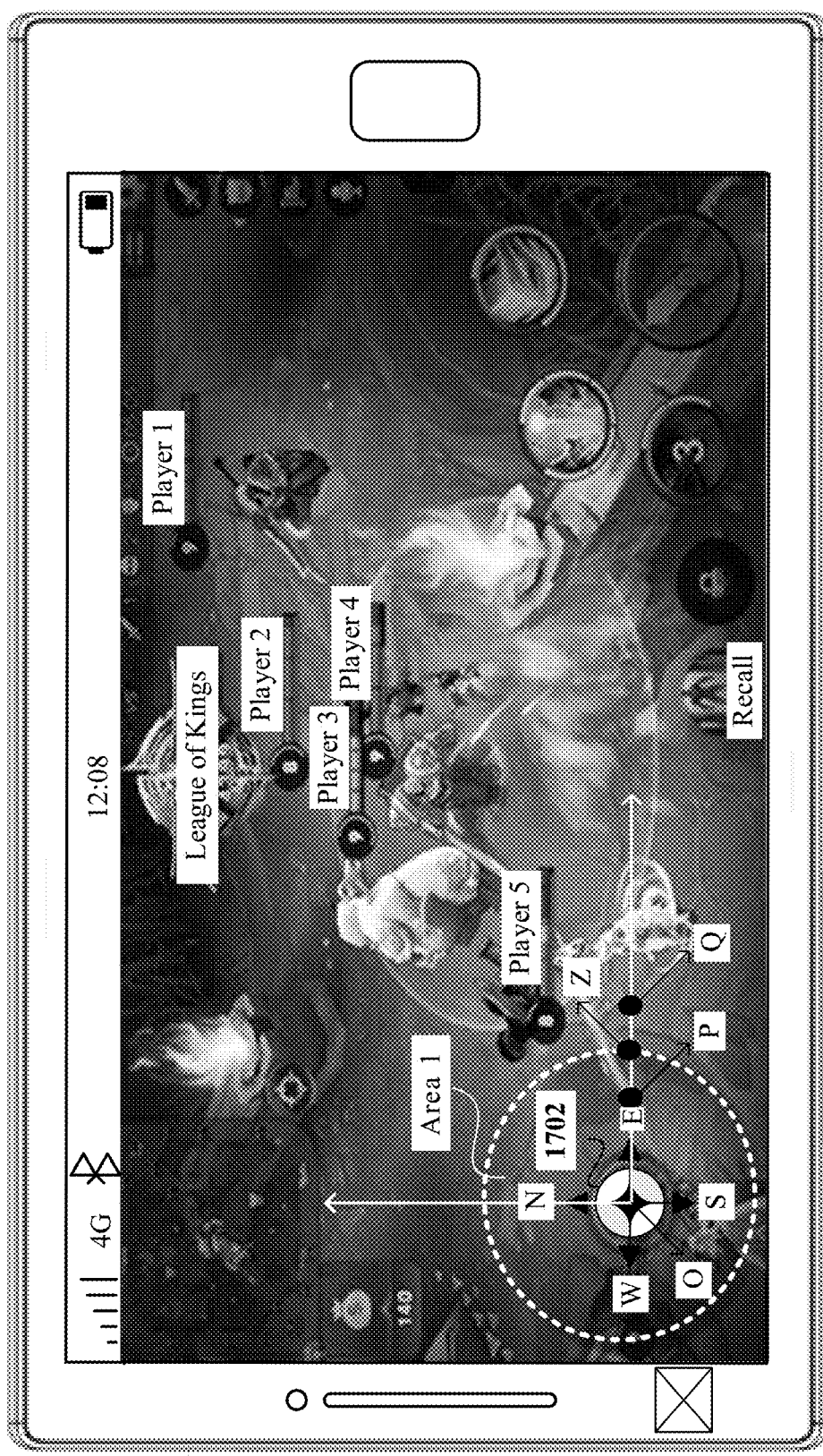
FIG. 21 is a schematic diagram 16 of an application scenario of a touch control method according to an embodiment of this application.

For example, as shown in FIG. 21, the terminal detects the first touch operation entered by the user at the point P (1, 0). Because the point P falls within the target touch area Area 1 customized by the user in the profile 1, the terminal modifies coordinates P (1, 0) to coordinates Q (1.8×1, 1.8×0)=Q (1.8, 0) based on a value 80 of a touch sensitivity in the profile 1. In this case, after the application A obtains the second touch operation whose coordinate values are Q (1.8, 0), if coordinates of a touch point in a touch operation received by the application A last time are O (0, 0), the application A considers that a finger of the user controls the simulated control handle 1702 to move rightward by 1.8 cm from O (0, 0) to Q (1.8, 0), and actually the user controls the simulated control handle 1702 to move rightward by 1 cm from the point O (0, 0) to the point P (1, 0). This implements an effect of controlling the simulated control handle 1702 to move 1.8 cm, and improves a movement speed of a game character.

In addition, if a control area of the simulated control handle 1702 is fixed, for example, the user is only allowed to control the simulated control handle 1702 in a circular area shown in an Area 1 in FIG. 21. In this case, if the terminal modifies the coordinates of the touch point in the first touch operation based on the value of the touch sensitivity, and the modified coordinates (for example, the Q point) exceed a control boundary of the control area Area 1 of the simulated control handle 1702, as shown in FIG. 21, the terminal may report, to the application A, a Z point that is on the control boundary and that is closest to the point Q as mapped coordinate information of the touch point in the second touch operation, so as to avoid a problem that the application cannot correctly respond to the first touch operation because the modified coordinates exceed the control area corresponding to the first touch operation.

Figure 22A:
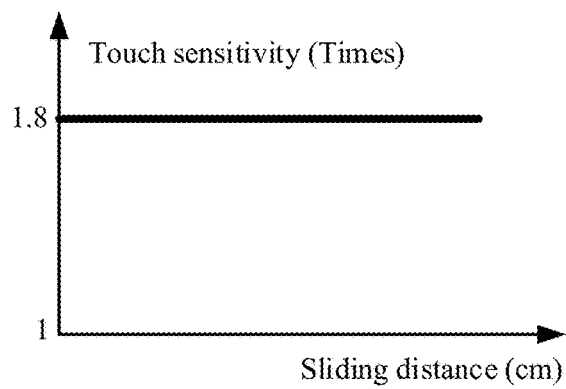
FIG. 22(a) and FIG. 22(b) are a schematic diagram 17 of an application scenario of a touch control method according to an embodiment of this application.

It should be noted that the foregoing embodiment is described by using an implementation of a fixed touch sensitivity as an example. In other words, as shown in FIG. 22(a), after the user sets the touch sensitivity of the target touch area Area 1 to 80, the terminal always responds to the touch operation of the user in the target touch area Area 1 in a ratio of 1.8.

Figure 22B:
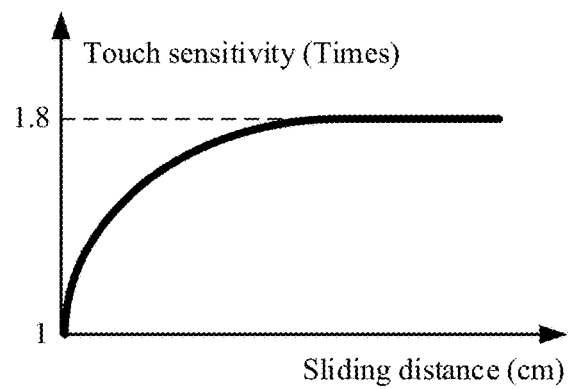

It may be understood that the terminal may also modify the touch operation in a non-linear manner, and finally reach a touch sensitivity that is set by the user. For example, as shown in FIG. 22(b), after the user sets the touch sensitivity of the target touch area Area 1 to 80, the terminal may change the touch sensitivity based on a distance of sliding by the user in the Area 1, and gradually increase the touch sensitivity of the terminal when the sliding distance is larger, until the touch sensitivity is increased to 1.8 times of the default touch sensitivity.

Figure 23:
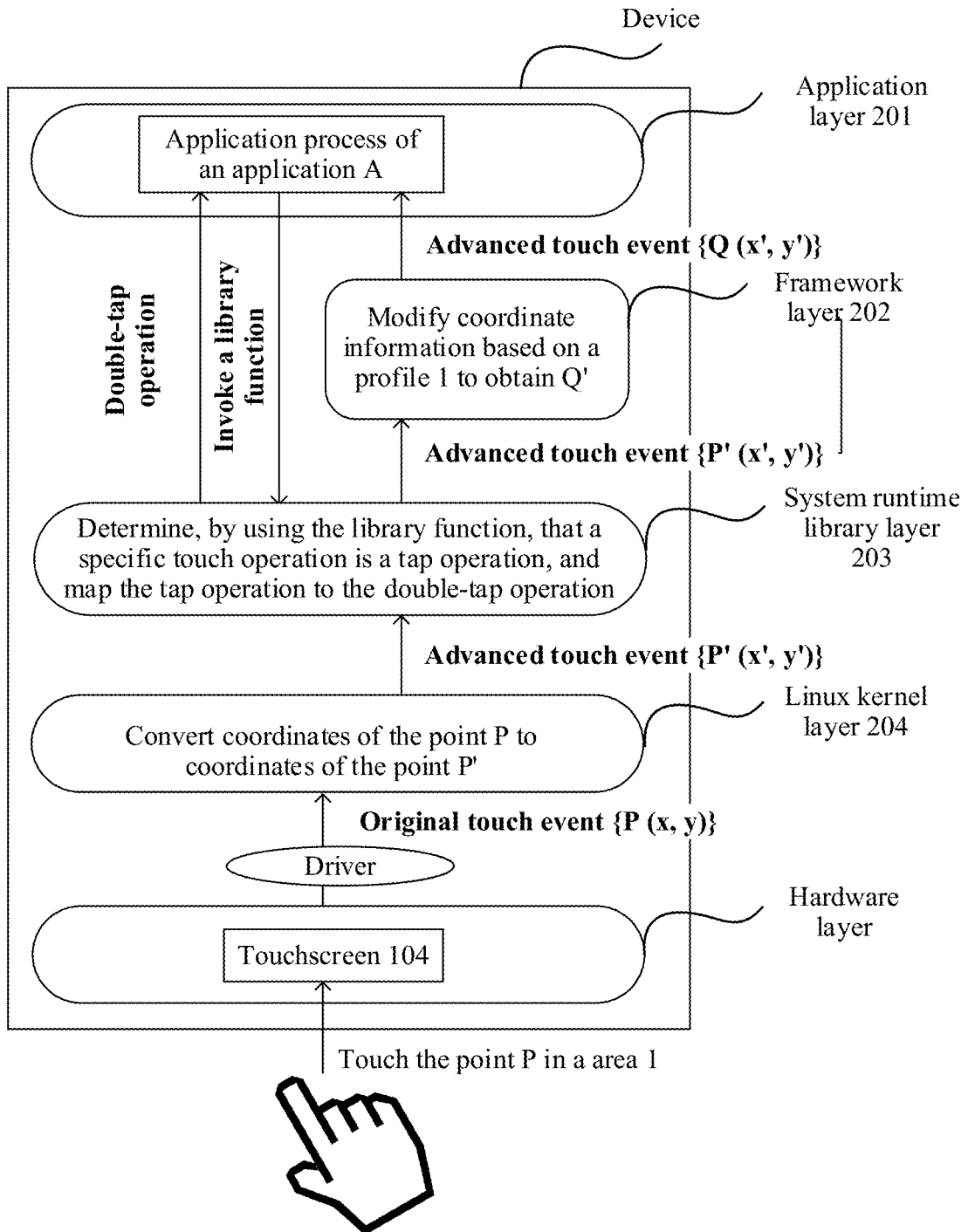
FIG. 23 is a schematic diagram 18 of an application scenario of a touch control method according to an embodiment of this application.

In addition, as shown in FIG. 23, after the framework layer 202 reports the advanced touch event to the application A that is running at the application layer, the application A may invoke a related library function at a system runtime library layer 203, and the library function helps the application A determine, based on a parameter transferred in the advanced touch event, a specific touch operation performed by the user at the point P, for example, a tap operation. After determining that the current touch operation is the tap operation, if a profile file corresponding to the touch point P records that a response event of the tap operation is a double-tap operation, the terminal does not callback a callback function written for the tap operation in the application A, but call back a callback function written for the double-tap operation in the application A, in other words, (the tap operation) the first touch operation is mapped to the second touch operation (the double-tap operation), so that the application A responds to the double-tap operation and implements an effect of the double-tap operation at the touch point P.

Certainly, if the framework layer 202 obtains an advanced touch event 1 generated when the user performs the tap operation at the point P, and can determine, based on the advanced touch event 1, that the user performs the tap operation at the point P, at this time, the framework layer 202 may modify, based on the profile file corresponding to the point, the advanced touch event 1 generated by the tap operation to an advanced touch event 2 that should be generated when the user performs the double-tap operation at the point P, and report the advanced touch event 2 to the application A that is running in the application layer. In this way, when the application A invokes a related library function at the system runtime library layer 203, it may be determined that a specific touch operation performed by the user at the point P is the double-tap operation. In this case, the terminal may call back the callback function written for the double-tap operation in the application A, so that the application A can also respond to the double-tap operation and implement the effect of the double-tap operation at the point P.

Further, in a running process of an application, the user usually has different requirements on a touch sensitivity of the application only when the user performs a touch operation of a sliding type. Therefore, when coordinate information in the touch operation falls within the target touch area, the terminal may determine, by using a library function, that the current touch operation is a sliding operation, and then, the coordinate information in the touch operation is modified based on the touch sensitivity customized by the user in the profile file.

Certainly, if the coordinate information in the touch operation does not fall within a target touch area preset for the target application, or a touch mapping rule that is set in a profile file corresponding to the coordinate information is a default touch mapping rule of the terminal, after obtaining the touch operation, the terminal does not need to modify the touch operation, and the target application responds to the touch operation based on related touch information carried in the actual touch operation. This is not limited in this embodiment of this application.

It may be understood that, to implement the foregoing functions, the terminal and the like include corresponding hardware structures and/or software modules for performing the functions. A person skilled in the art should easily be aware that, in combination with the examples described in the embodiments disclosed in this specification, units, algorithms, and steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the terminal may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in this embodiment of this application, module division is an example, and is merely logical function division. In actual implementation, another division manner may be used.

Figure 24:
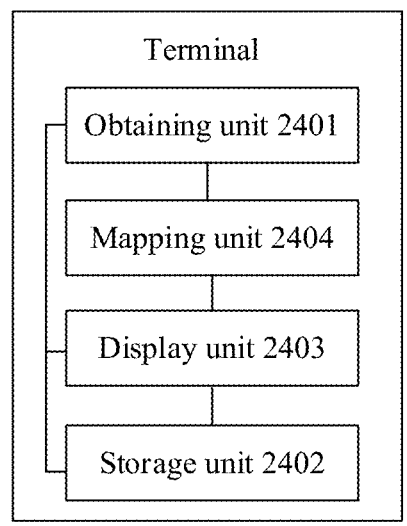
FIG. 24 is a schematic structural diagram 2 of a terminal according to an embodiment of this application.

When each function module is obtained through division based on each corresponding function, FIG. 24 is a possible schematic structural diagram of the terminal in the foregoing embodiments. The terminal includes an obtaining unit 2401, a storage unit 2402, a display unit 2403, and a mapping unit 2404.

The obtaining unit 2401 is configured to support the terminal in performing processes S501 and S503 in FIG. 5 and process S601 in FIG. 17. The storage unit 2402 is configured to support the terminal in performing the process S504 in FIG. 5. The display unit 2403 is configured to support the terminal in performing the process S502 in FIG. 5. The mapping unit 2404 is configured to support the terminal in performing the processes S602 to S604 in FIG. 17. All related content of the steps in the foregoing method embodiments may be cited in function descriptions of a corresponding functional module. Details are not described herein again.

When an integrated unit is used, the mapping unit 2404 may be used as a processing module, the storage unit 2402 may be used as a storage module, the obtaining unit 2401 may be used as an input module, and the display unit 1106 may be used as a display module.

Figure 25:
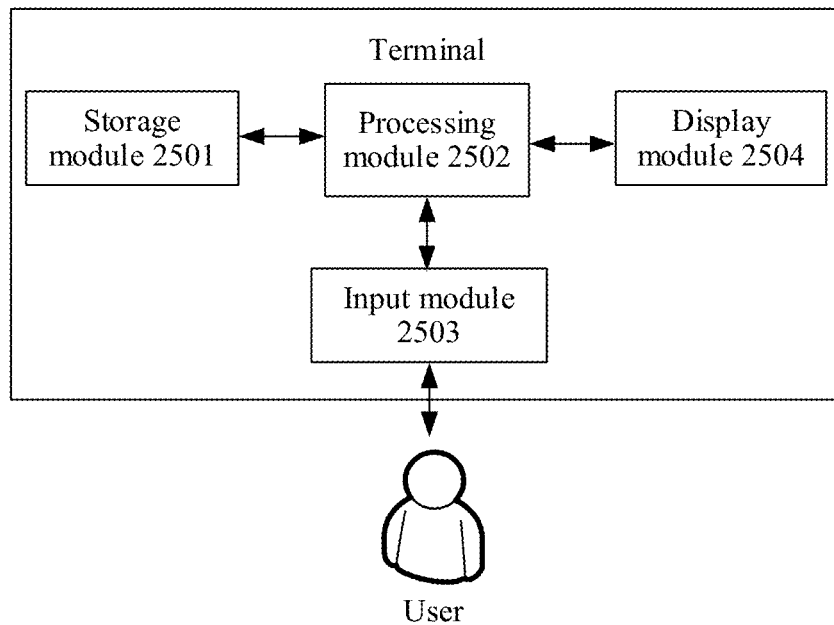
FIG. 25 is a schematic structural diagram 3 of a terminal according to an embodiment of this application.

In this case, FIG. 25 is a possible schematic structural diagram of a terminal in the foregoing embodiments. A processing module 2502 is configured to control and manage an action of the terminal. An input module 2503 is configured to support interaction between the terminal and a user. A storage module 2501 is configured to store program code and data of the terminal. The display module 2504 is configured to display the information entered by the user or information provided for the user, and various menus of the terminal.

In this embodiment of this application, the terminal may obtain, by using the input module 2503, a first touch operation entered by the user on a touchscreen. When the first touch operation is performed on a first preset area on a target interface (namely, an interface on which a target application runs in the foreground), the processing module 2502 may map the first touch operation to a second touch operation, so that the target application responds to the second touch operation, to implement refined and personalized control on the touchscreen.

All related content of the steps related to the application switching method may be cited in related descriptions in steps S501 to S504 or S601 to S604 in the foregoing embodiment. Details are not described herein again.

The processing module 2502 may be a processor or a controller, such as a central processing unit (CPU), a GPU, a general-purpose processor, a digital signal processor (DSP), an application-specific integrated circuit (ASIC), a field programmable gate array (FPGA), or another programmable logic device, a transistor logic device, a hardware component, or a combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

The input module 2503 may be an input/output device or a communications interface such as a touchscreen or a microphone.

The storage module 2501 may be a memory. The memory may include a high-speed random access memory (RAM), or may include a nonvolatile memory, such as a disk storage device, a flash storage device, or another volatile solid-state storage device.

The display module 2504 may be a display, and the display may be specifically configured in a form of a liquid crystal display, an organic light-emitting diode, or the like. In addition, a touchpad may be further integrated into the display, and is configured to: collect a touch event on or near the touchpad, and send collected touch information to another component (such as the processor).

When the processing module 2502 is a processor, the input module 2503 is a touchscreen, the storage module 2501 is a memory, and the display module 2504 is a display, the terminal provided in this embodiment of this application may be the mobile phone 100 shown in FIG. 1.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD).

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A touch control method, comprising:
   obtaining, by a terminal, a first touch operation entered by a user on a touchscreen; and
   mapping, by the terminal, the first touch operation to a second touch operation when the first touch operation is performed on a first preset area in a target interface, so that a target application responds to the second touch operation, wherein
   the target interface is any interface that is presented by the target application and that covers the first preset area, and the target application is running in the foreground; and
   wherein the mapping, by the terminal, the first touch operation to a second touch operation when the first touch operation is performed on a first preset area in a target interface comprises:
   when the terminal detects the first touch operation in the target interface, searching for, by the terminal, at least one preset area associated with the target application, wherein the at least one preset area comprises the first preset area;
   when a touch point of the first touch operation falls within the first preset area, obtaining, by the terminal, a touch mapping rule that is preset for the first preset area; and
   mapping, by the terminal, the first touch operation to the second touch operation according to the touch mapping rule.

2. The method according to claim 1, A touch control method, comprising:
   obtaining, by a terminal, a first touch operation entered by a user on a touchscreen; and
   mapping, by the terminal, the first touch operation to a second touch operation when the first touch operation is performed on a first preset area in a target interface, so that a target application responds to the second touch operation, wherein
   the target interface is any interface that is presented by the target application and that covers the first preset area, and the target application is running in the foreground; and wherein the mapping, by the terminal, the first touch operation to a second touch operation comprises:
   modifying, by the terminal, coordinate values of the touch point in the first touch operation, and using modified coordinate values as coordinate values of a touch point in the second touch operation.

3. The method according to claim 1, wherein the touch mapping rule comprises a coordinate mapping parameter; and
   the mapping, by the terminal, the first touch operation to the second touch operation according to the touch mapping rule comprises:
   increasing or decreasing, by the terminal, coordinate values of the touch point in the first touch operation based on the coordinate mapping parameter, to obtain coordinate values of a touch point in the second touch operation.

4. The method according to claim 3, wherein the increasing or decreasing, by the terminal, coordinate values of the touch point in the first touch operation based on the coordinate mapping parameter comprises:
   multiplying, by the terminal, the coordinate values of the touch point in the first touch operation by the coordinate mapping parameter, wherein the coordinate mapping parameter is greater than 1 or less than 1.

5. The method according to claim 2, wherein after the modifying, by the terminal, coordinate values of the touch point in the first touch operation, the method further comprises:
   if the touch point with the modified coordinate values falls beyond a preset control boundary of the first touch operation, using, by the terminal, coordinate values that are on the control boundary and that are most approximate to the modified coordinate values as the coordinate values of the touch point in the second touch operation.

6. The method according to claim 1, wherein the mapping, by the terminal, the first touch operation to the second touch operation according to the touch mapping rule comprises:
   mapping, by the terminal according to the touch mapping rule, a first touch event generated when the user performs the first touch operation to a second touch event generated when the user performs the second touch operation, and reporting the second touch event to the target application.

7. The method according to claim 1, wherein the mapping, by the terminal, the first touch operation to a second touch operation, so that the target application responds to the second touch operation comprises:
   reporting, by the terminal to the target application, a touch event generated when the user performs the first touch operation, so that the target application instructs the terminal to determine the first touch operation based on the touch event; and
   mapping, by the terminal, the determined first touch operation to the second touch operation according to the touch mapping rule, and instructing the target application to respond to the second touch operation.

8. The method according to claim 6, wherein the touch mapping rule maps a tap operation to a double-tap operation, or maps a touch and hold operation to a continuous tap operation.

9. A terminal, comprising a processor, a memory, and an input device that are connected via a bus, wherein
   the input device is configured to obtain a first touch operation entered by a user on a touchscreen; and
   the processor is configured to:
   determine that the first touch operation is performed on a first preset area in a target interface, and map the first touch operation to a second touch operation, so that a target application responds to the second touch operation;

search for at least one preset area associated with the target application, wherein the at least one preset area comprises the first preset area; and when a touch point of the first touch operation falls within the first preset area, obtain a touch mapping rule that is preset for the first preset area, and map the first touch operation to the second touch operation according to the touch mapping rule;

wherein the target interface is any interface that is presented by the target application and that covers the first preset area, and the target application is running in the foreground.

10. A terminal, comprising a processor, a memory, and an input device that are connected via a bus, wherein the input device is configured to obtain a first touch operation entered by a user on a touchscreen; and the processor is configured to:

determine that the first touch operation is performed on a first preset area in a target interface, and map the first touch operation to a second touch operation, so that a target application responds to the second touch operation;

wherein that the processor maps the first touch operation to a second touch operation comprises:

the processor modifies coordinate values of the touch point in the first touch operation, and uses modified coordinate values as coordinate values of a touch point in the second touch operation.

11. The terminal according to claim 9, wherein the touch mapping rule comprises a coordinate mapping parameter, and that the processor maps the first touch operation to the second touch operation according to the touch mapping rule comprises:

the processor increases or decreases coordinate values of the touch point in the first touch operation based on the coordinate mapping parameter, to obtain coordinate values of a touch point in the second touch operation.

12. The terminal according to claim 11, wherein that the processor increases or decreases coordinate values of the touch point in the first touch operation based on the coordinate mapping parameter comprises:

the processor multiplies the coordinate values of the touch point in the first touch operation by the coordinate mapping parameter, wherein the coordinate mapping parameter is greater than 1 or less than 1.

13. The terminal according to claim 10, wherein the processor is further configured to determine that the touch point with the modified coordinate values falls beyond a preset control boundary of the first touch operation, and use coordinate values that are on the control boundary and that are most approximate to the modified coordinate values as the coordinate values of the touch point in the second touch operation.

14. The terminal according to claim 9, wherein that the processor maps the first touch operation to the second touch operation according to the touch mapping rule comprises:

the processor maps, according to the touch mapping rule, a first touch event generated when the user performs the first touch operation to a second touch event generated when the user performs the second touch operation, and reports the second touch event to the target application.

15. The terminal according to claim 9, wherein that the processor maps the first touch operation to a second touch operation, so that the target application responds to the second touch operation comprises:

the processor reports, to the target application, a touch event generated when the user performs the first touch operation, so that the target application instructs the terminal to determine the first touch operation based on the touch event; and the processor maps the determined first touch operation to the second touch operation according to the touch mapping rule, and instructs the target application to respond to the second touch operation.

16. A non-transitory computer-readable storage medium, wherein the computer-readable storage medium stores an instruction, and when the instruction is run on a terminal, the terminal is enabled to perform:

obtaining, by a terminal, a first touch operation entered by a user on a touchscreen; and mapping, by the terminal, the first touch operation to a second touch operation when the first touch operation is performed on a first preset area in a target interface, so that a target application responds to the second touch operation;

wherein the target interface is any interface that is presented by the target application and that covers the first preset area, and the target application is running in the foreground; and wherein the mapping, by the terminal, the first touch operation to a second touch operation comprises modifying, by the terminal, coordinate values of the touch point in the first touch operation, and using modified coordinate values as coordinate values of a touch point in the second touch operation.

* * * * *